(12) United States Patent
Barker et al.

(10) Patent No.: US 8,313,719 B2
(45) Date of Patent: Nov. 20, 2012

(54) METHOD OF MAKING ACTIVE MATERIALS FOR USE IN SECONDARY ELECTROCHEMICAL CELLS

(75) Inventors: Jeremy Barker, Oxfordshire (GB); Aiden Bryan, Newtownabbey (GB); Paul Burns, Enniskillen (GB); Richard Gover, Worcestershire (GB)

(73) Assignee: Valence Technology, Inc., Las Vegas, NV (US)

( * ) Notice: Subject to any disclaimer, the term of this patent is extended or adjusted under 35 U.S.C. 154(b) by 0 days.

(21) Appl. No.: 13/106,196

(22) Filed: May 12, 2011

(65) Prior Publication Data

US 2011/0210288 A1    Sep. 1, 2011

Related U.S. Application Data

(63) Continuation of application No. 11/682,339, filed on Mar. 6, 2007, now abandoned, which is a continuation-in-part of application No. 11/277,746, filed on Mar. 28, 2006.

(60) Provisional application No. 60/729,932, filed on Oct. 25, 2005, provisional application No. 60/666,132, filed on Mar. 28, 2005.

(51) Int. Cl.
*C01B 25/00* (2006.01)
(52) U.S. Cl. ...... 423/302; 423/305; 423/306; 429/231.5
(58) Field of Classification Search .................. 423/302, 423/305, 306; 429/231.5
See application file for complete search history.

(56) References Cited

U.S. PATENT DOCUMENTS

| 6,387,568 | B1 | 5/2002 | Barker et al. |
|---|---|---|---|
| 6,645,452 | B1 | 11/2003 | Barker et al. |
| 6,777,132 | B2 | 8/2004 | Barker et al. |
| 6,964,827 | B2 | 11/2005 | Barker et al. |
| 2003/0013019 | A1 | 1/2003 | Barker et al. |
| 2004/0126300 | A1 | 7/2004 | Barker et al. |
| 2004/0214084 | A1 | 10/2004 | Barker et al. |
| 2005/0255383 | A1 | 11/2005 | Barker et al. |
| 2006/0014078 | A1 | 1/2006 | Swoyer et al. |
| 2007/0009800 | A1 | 1/2007 | Barker et al. |

OTHER PUBLICATIONS

Gover et al., "LiVPO4F: A New Active Material for Safe Lithium-Ion Batteries", Solid State Ionics 177 (2006) 2635-2638.
Barker et al., "Structural and Electrochemical Properties of Lithium Vanadium Fluorophosphate, LiVPO4F", Journal of Power Sources 146 (2005) 516.
Barker et al., "Performance Evaluation of Lithium Vanadium Fluorophosphate in Lithium Metal and Lithium-Ion Cells", J.Electro Society 152(9), A1776-A1779 (2005).
Barker et al., "A Comparative Investigation of the Li Insertion Properties of the Novel Fluorophosphate Phases, NaVPO4F", J.Electro Society, 151(10), A1670 (2004).
Barker et al., "Electrochemical Insertion Properties of the Novel Lithium Vanadium Fluorophosphate, LiVPO4F", J.Electrochemical Soc., 150(10), A1394-A1398 (2003).
Barker et al., "LiVP2O7: A Viable Lithium-Ion Cathode Material?", Electrochemical and Solid-State Letters, 8(9), A446-A448, (2005).
Barker et al., "Hybrid-Ion: A Lithium-Ion Cell Based on a Sodium Insertion Material", Electrochemical and Solid-State Letters, 9(4), A190-A192 (2006).
Barker et al, "A Symmetrical Lithium-Ion Cell Based on Lithium Vanadium Fluorophosphate, LiVPO4F", Electrochemical and Solid-State Letters, 8(6), A285-A287 (2005).
Barker et al., "A Lithium-Ion Cell Based on Li4/3Ti5/3O4 and LiVPO4F", Electrochemical and Solid State Letters, 10(5), pp. A130-A133 (2007).
Gover et al., "The Electrochemical Insertion Properties of Sodium Vanadium Fluorophosphate, Na3V2(PO4)2F3", Solid State Ionics 177 (2006) 1495-1500.
PCT International Search Report PCT/US08/55801 dated Aug. 4, 2008.

*Primary Examiner* — Steven Bos
(74) *Attorney, Agent, or Firm* — Cynthia S. Kovacevic; Brian T. Mangum; Roger A. Williams

(57) ABSTRACT

The present invention provides for the preparation of an "optimized" VPO$_4$ phase or V—P—O/C precursor. The VPO$_4$ precursor is an amorphous or nanocrystalline powder. The V—P—O/C precursor is amorphous in nature and contains finely divided and dispersed carbon. Throughout the specification it is understood that the VPO$_4$ precursor and the V—P—O/C precursor materials can be used interchangeably to produce the final vanadium phosphates, with the V—P—O/C precursor material being the preferred precursor. The precursors can subsequently be used to make vanadium based electroactive materials and use of such precursor materials offers significant advantages over other processes known for preparing vanadium phosphate compounds.

15 Claims, 21 Drawing Sheets

Obtained X-ray pattern for a sample of $VPO_4$ made at 700°C for 4 hours

Obtained X-ray powder pattern for a sample of LiVPO$_4$F

Observed, difference and calculated plot obtained from Rietveld analysis of an optimized sample of LiVPO$_4$F A schematic representation of the structure of LiVPO$_4$F projected down the c axis First cycle constant current data for a Li//LiVPO$_4$F cell Obtained X-ray powder patterns for $LiV_{1-x}Al_xPO_4F$ Unit cell volume versus Al Content for $LiV_{1-x}Al_xPO_4F$ A comparison of the electrochemical response of Li//LiVPO$_4$F, Li//LiAl$_{0.25}$V$_{0.75}$PO$_4$F and Li//LiAl$_{0.5}$V$_{0.5}$PO$_4$F cells Obtained X-ray powder pattern for LiVP$_2$O$_7$

*Observed, difference and calculated plots obtained for a sample of $LiVP_2O_7$ from a Rietveld analysis*

Schematic representation of structure of $LiVP_2O_7$

*First cycle constant current data for a Li//LiVP$_2$O$_7$ cell*

EVS data for a representative Li//LiVP$_2$O$_7$ cell cycled between 2.5 – 4.7 V
Left: EVS Voltage Profile. Right EVS Differential Capacity Profile EVS data for a representative Graphite//LiVP$_2$O$_7$ lithium-ion cell cycled between 2.5 – 4.6 V. The data shown is for the 10th cycle.
Left: EVS Voltage Profile. Right EVS Differential Capacity Profile Life cycle data collected for $LiVP_2O_7$//graphite cell Powder X-ray diffraction pattern of the $LiV_{1-x}Al_xP_2O_7$ samples prepared from the $[(1-x)VPO_4+x\ AlPO_4]$ precursors Electrochemical results for samples prepared. X values for $LiV_{1-x}Al_xP_2O_7$ as shown on figures Comparison of a sample of LVP prepared using conventional and $VPO_4$ method LVP sample prepared from V-P-O precursor Powder X-ray diffraction pattern for $Na_3V_2(PO_4)_2F_3$ prepared from the V-P-O precursor

METHOD OF MAKING ACTIVE MATERIALS FOR USE IN SECONDARY ELECTROCHEMICAL CELLS

FIELD OF THE INVENTION

This application is a continuation of U.S. patent application Ser. No. 11/682,339 filed Mar. 6, 2007 now abandoned which is a continuation-in-part of U.S. patent application Ser. No. 11/277,746 filed Mar. 28, 2006, which claims priority from U.S. provisional patent application 60/729,932 filed Oct. 25, 2005, which claims priority from U.S. provisional patent application 60/666,132 filed Mar. 28, 2005.

The present invention relates to the novel preparation of a nanocrystalline $VPO_4$ precursor and in another embodiment to an amorphous V—P—O/C precursor (or V—P—O-carbon composite material/precursor). The invention further relates to the use of this $VPO_4$ precursor or V—P—O/C precursor in methods for making vanadium phosphate compounds. Such methods for making vanadium phosphates are beneficial in that the methods proceed at faster reaction rates and at lower temperatures then known methods for making vanadium phosphates. Such precursors also produce a purer product. The vanadium phosphate compounds so prepared are electroactive and are useful in making electrochemical cells.

BACKGROUND OF THE INVENTION

A battery pack consists of one or more electrochemical cells or batteries, wherein each cell typically includes a positive electrode, a negative electrode, and an electrolyte or other material for facilitating movement of ionic charge carriers between the negative electrode and positive electrode. As the cell is charged, cations migrate from the positive electrode to the electrolyte and, concurrently, from the electrolyte to the negative electrode. During discharge, cations migrate from the negative electrode to the electrolyte and, concurrently, from the electrolyte to the positive electrode.

By way of example and generally speaking, lithium ion batteries are prepared from one or more lithium ion electrochemical cells containing electrochemically active (electroactive) materials. Such cells typically include, at least, a negative electrode, a positive electrode, and an electrolyte for facilitating movement of ionic charge carriers between the negative and positive electrode. As the cell is charged, lithium ions are transferred from the positive electrode to the electrolyte and, concurrently from the electrolyte to the negative electrode. During discharge, the lithium ions are transferred from the negative electrode to the electrolyte and, concurrently from the electrolyte back to the positive electrode. Thus with each charge/discharge cycle the lithium ions are transported between the electrodes. Such lithium ion batteries are called rechargeable lithium ion batteries or rocking chair batteries.

The electrodes of such batteries generally include an electroactive material having a crystal lattice structure or framework from which ions, such as lithium ions, can be extracted and subsequently reinserted and/or from which ions such as lithium ions can be inserted or intercalated and subsequently extracted. Recently a class of transition metal phosphates and mixed metal phosphates have been developed, which have such a crystal lattice structure. These transition metal phosphates are insertion based compounds and allow great flexibility in the design of lithium ion batteries.

A class of such materials is disclosed in U.S. Pat. No. 6,528,033 B1 (Barker et al.). The compounds therein are of the general formula $Li_aMI_bMII_c(PO_4)_d$ wherein MI and MII are the same or different. MI is a metal selected from the group consisting of Fe, Co, Ni, Mn, Cu, V, Sn, Cr and mixtures thereof. MII is optionally present, but when present is a metal selected from the group consisting of Mg, Ca, Zn, Sr, Pb, Cd, Sn, Ba, Be and mixtures thereof. More specific examples of such compounds include compounds wherein MI is vanadium and more specifically includes $Li_3V_2(PO_4)_3$. U.S. Pat. No. 6,645,452 B1 (Barker et al.) further discloses electroactive vanadium phosphates such as $LiVPO_4F$ and $LiV_{0.9}Al_{o.1}PO_4F$.

Although these compounds find use as electrochemically active materials these materials are not always economical to produce. Thus it would be beneficial to have a process for preparing such intercalation materials at lower temperatures and with faster reaction kinetics. The inventors of the present invention have now found a method for preparing a novel $VPO_4$ precursor and a novel V—P—O/C precursor and processes employing such precursors to produce vanadium phosphate compounds more economically and efficiently.

SUMMARY OF THE INVENTION

The present invention provides for the preparation of an "optimized" $VPO_4$ phase or V—P—O/C precursor. The $VPO_4$ precursor is an amorphous or nanocrystalline powder. The V—P—O/C precursor is amorphous in nature and contains finely divided and dispersed carbon. Throughout the specification it is understood that the $VPO_4$ precursor and the V—P—O/C precursor materials can be used interchangeably to produce the final vanadium phosphates, with the V—P—O/C precursor material being the preferred precursor. The precursors can subsequently be used to make vanadium based electroactive materials and use of such precursor materials offers significant advantages over other processes known for preparing vanadium phosphate compounds.

DETAILED DESCRIPTION OF THE INVENTION

Specific benefits and embodiments of the present invention are apparent from the detailed description set forth herein below. It should be understood, however, that the detailed description and specific examples, while indicating embodiments among those preferred, are intended for purposes of illustration only and are not intended to limit the scope of the invention.

The following is a list of some of the definitions of various terms used herein:

As used herein "battery" refers to a device comprising one or more electrochemical cells for the production of electricity. Each electrochemical cell comprises an anode, a cathode and an electrolyte.

As used herein the terms "anode" and "cathode" refer to the electrodes at which oxidation and reduction occur, respectively, during battery discharge. During charging of the battery, the sites of oxidation and reduction are reversed.

As used herein the terms "nominal formula" or "nominal general formula" refer to the fact that the relative proportion of atomic species may vary slightly on the order of 2 percent to 5 percent, or more typically, 1 percent to 3 percent.

As used herein the words "preferred" and "preferably" refer to embodiments of the invention that afford certain benefits under certain circumstances. Further the recitation of one or more preferred embodiments are not useful and is not intended to exclude other embodiments from the scope of the invention.

Figure 1:
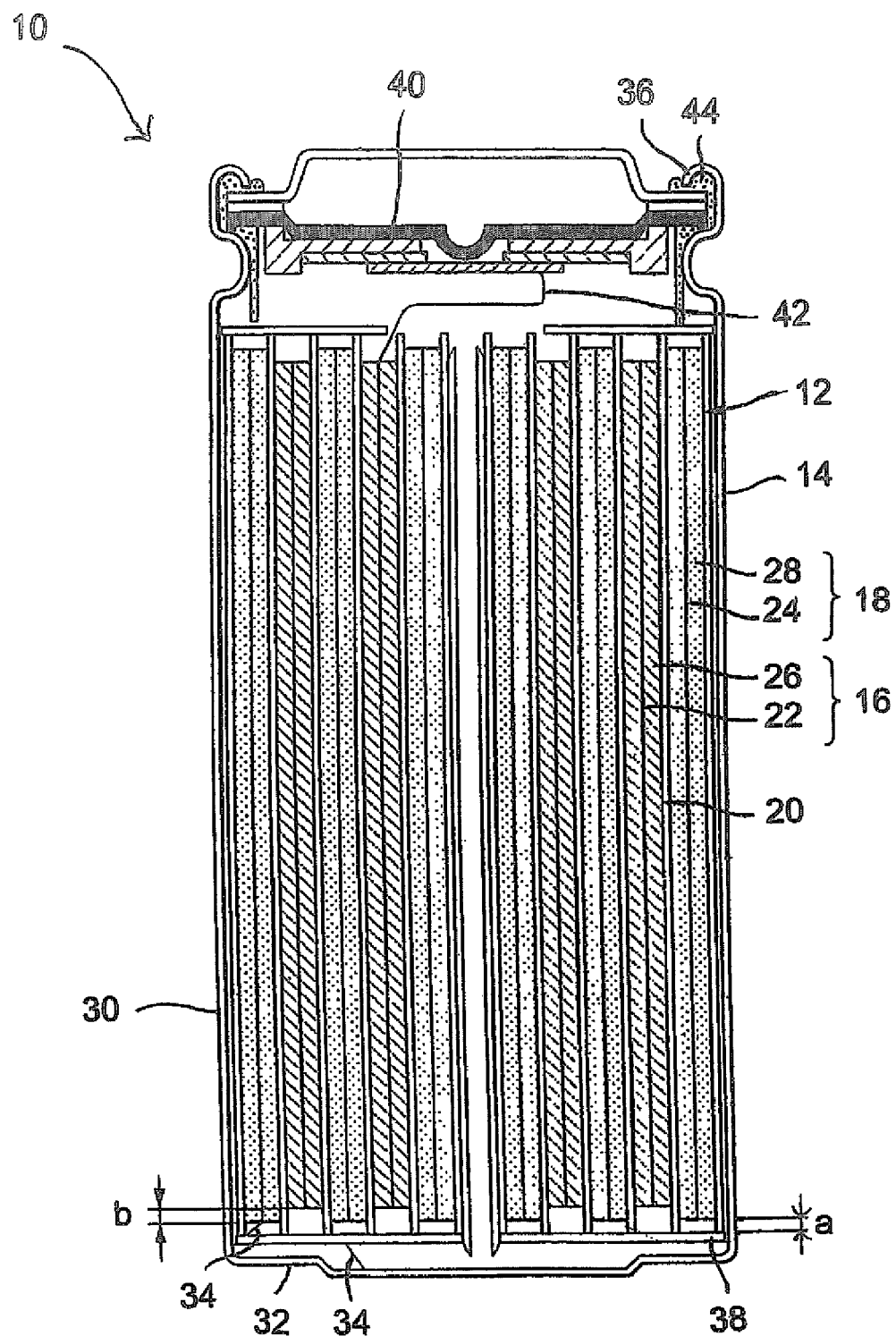
FIG. 1 is a schematic cross-sectional diagram illustrating the structure of a non-aqueous electrolyte cylindrical electrochemical cell of the present invention.

Referring to FIG. 1, a secondary electrochemical cell 10 having an electrode active material described herein below as nominal general formula (I), is illustrated. The cell 10 includes a spirally coiled or wound electrode assembly 12 enclosed in a sealed container, preferably a rigid cylindrical casing 14. The electrode assembly 12 includes: a positive electrode 16 consisting of, among other things, an electrode active material described herein below; a counter negative electrode 18; and a separator 20 interposed between the first and second electrodes 16, 18. The separator 20 is preferably an electrically insulating, ionically conductive microporous film, and composed of a polymeric material selected from the group consisting of polyethylene, polyethylene oxide, polyacrylonitrile and polyvinylidene fluoride, polymethyl methacrylate, polysiloxane, copolymers thereof, and admixtures thereof.

Each electrode 16, 18 includes a current collector 22 and 24, respectively, for providing electrical communication between the electrodes 16, 18 and an external load. Each current collector 22, 24 is a foil or grid of an electrically conductive metal such as iron, copper, aluminum, titanium, nickel, stainless steel, or the like, having a thickness of between 5 μm and 100 μm, preferably 5 μm and 20 μm. Optionally, the current collector may be treated with an oxide-removing agent such as a mild acid and the like, and coated with an electrically conductive coating for inhibiting the formation of electrically insulating oxides on the surface of the current collector 22, 24. Examples of suitable coatings include polymeric materials comprising a homogenously dispersed electrically conductive material (e.g. carbon), such polymeric materials including: acrylics including acrylic acid and methacrylic acids and esters, including poly (ethylene-co-acrylic acid); vinylic materials including poly(vinyl acetate) and poly(vinylidene fluoride-co-hexafluoropropylene); polyesters including poly(adipic acid-co-ethylene glycol); polyurethanes; fluoroelastomers; and mixtures thereof.

The positive electrode 16 further includes a positive electrode film 26 formed on at least one side of the positive electrode current collector 22, preferably both sides of the positive electrode current collector 22, each film 26 having a thickness of between 10 μm and 150 μm, preferably between 25 μm an 125 μm, in order to realize the optimal capacity for the cell 10. The positive electrode film 26 is preferably composed of between 80% and 99% by weight of an electrode active material described herein below as general formula (I), between 1% and 10% by weight binder, and between 1% and 10% by weight electrically conductive agent.

Suitable binders include: polyacrylic acid; carboxymethylcellulose; diacetylcellulose; hydroxypropylcellulose; polyethylene; polypropylene; ethylene-propylene-diene copolymer; polytetrafluoroethylene; polyvinylidene fluoride; styrene-butadiene rubber; tetrafluoroethylene-hexafluoropropylene copolymer; polyvinyl alcohol; polyvinyl chloride; polyvinyl pyrrolidone; tetrafluoroethylene-perfluoroalkylvinyl ether copolymer; vinylidene fluoride-hexafluoropropylene copolymer; vinylidene fluoride-chlorotrifluoroethylene copolymer; ethylenetetrafluoroethylene copolymer; polychlorotrifluoroethylene; vinylidene fluoride-pentafluoropropylene copolymer; propylene-tetrafluoroethylene copolymer; ethylene-chlorotrifluoroethylene copolymer; vinylidene fluoride-hexafluoropropylene-tetrafluoroethylene copolymer; vinylidene fluoride-perfluoromethylvinyl ether-tetrafluoroethylene copolymer; ethylene-acrylic acid copolymer; ethylene-methacrylic acid copolymer; ethylene-methyl acrylate copolymer; ethylene-methyl methacrylate copolymer; styrene-butadiene rubber; fluorinated rubber; polybutadiene; and admixtures thereof. Of these materials, most preferred are polyvinylidene fluoride and polytetrafluoroethylene.

Suitable electrically conductive agents include: natural graphite (e.g. flaky graphite, and the like); manufactured graphite; carbon blacks such as acetylene black, Ketzen black, channel black, furnace black, lamp black, thermal black, and the like; conductive fibers such as carbon fibers and metallic fibers; metal powders such as carbon fluoride, copper, nickel, and the like; and organic conductive materials such as polyphenylene derivatives.

The negative electrode 18 is formed of a negative electrode film 28 formed on at least one side of the negative electrode current collector 24, preferably both sides of the negative electrode current collector 24. The negative electrode film 28 is composed of between 80% and 95% of an intercalation material, between 2% and 10% by weight binder, and (optionally) between 1% and 10% by weight of an electrically conductive agent.

Intercalation materials suitable herein include: transition metal oxides, metal chalcogenides, carbons (e.g. graphite), and mixtures thereof capable of intercalating the alkali metal-ions present in the electrolyte in the electrochemical cell's nascent state.

In one embodiment, the intercalation material is selected from the group consisting of crystalline graphite and amorphous graphite, and mixtures thereof, each such graphite having one or more of the following properties: a lattice interplane (002) d-value ($d_{(002)}$) obtained by X-ray diffraction of between 3.35 Å to 3.34 Å, inclusive (3.35 Å$\leq d_{(002)}$ $\leq$3.34 Å), preferably 3.354 Å to 3.370 Å, inclusive (3.354 Å$\leq d_{(002)} \leq$3.370 Å; a crystallite size ($L_c$) in the c-axis direction obtained by X-ray diffraction of at least 200 Å, inclusive ($L_c \geq$200 Å), preferably between 200 Å and 1,000 Å, inclusive (200 Å$\leq L_c \leq$1,000 Å); an average particle diameter ($P_d$) of between 1 μm to 30 μm, inclusive (1 μm$\leq P_d \leq$30 μm); a specific surface (SA) area of between 0.5 m$^2$/g to 50 m$^2$/g, inclusive (0.5 m$^2$/g$\leq$SA$\leq$50 m$^2$/g); and a true density ($\rho$) of between 1.9 g/cm$^3$ to 2.25 g/cm$^3$, inclusive (1.9 g/cm$^3 \leq \rho \leq$2.25 g/cm$^3$).

Referring again to FIG. 1, to ensure that the electrodes 16, 18 do not come into electrical contact with one another, in the event the electrodes 16, 18 become offset during the winding operation during manufacture, the separator 20 "overhangs" or extends a width "a" beyond each edge of the negative electrode 18. In one embodiment, 50 μm$\leq$a$\leq$2,000 μm. To ensure alkali metal does not plate on the edges of the negative electrode 18 during charging, the negative electrode 18 "overhangs" or extends a width "b" beyond each edge of the positive electrode 16. In one embodiment, 50 μm$\leq$b$\leq$2,000 μm.

The cylindrical casing 14 includes a cylindrical body member 30 having a closed end 32 in electrical communication with the negative electrode 18 via a negative electrode lead 34, and an open end defined by crimped edge 36. In operation, the cylindrical body member 30, and more particularly the closed end 32, is electrically conductive and provides electrical communication between the negative electrode 18 and an external load (not illustrated). An insulating member 38 is interposed between the spirally coiled or wound electrode assembly 12 and the closed end 32.

A positive terminal subassembly 40 in electrical communication with the positive electrode 16 via a positive electrode lead 42 provides electrical communication between the positive electrode 16 and the external load (not illustrated). Preferably, the positive terminal subassembly 40 is adapted to sever electrical communication between the positive electrode 16 and an external load/charging device in the event of an overcharge condition (e.g. by way of positive temperature coefficient (PTC) element), elevated temperature and/or in the event of excess gas generation within the cylindrical casing 14. Suitable positive terminal assemblies 40 are disclosed in U.S. Pat. No. 6,632,572 to Iwaizono, et al., issued Oct. 14, 2003; and U.S. Pat. No. 6,667,132 to Okochi, et al., issued Dec. 23, 2003. A gasket member 42 sealingly engages the upper portion of the cylindrical body member 30 to the positive terminal subassembly 40.

A non-aqueous electrolyte (not shown) is provided for transferring ionic charge carriers between the positive electrode 16 and the negative electrode 18 during charge and discharge of the electrochemical cell 10. The electrolyte includes a non-aqueous solvent and an alkali metal salt dissolved therein capable of forming a stable SEI layer on the negative electrode (most preferably, a lithium salt). In the electrochemical cell's nascent state (namely, before the cell undergoes cycling), the non-aqueous electrolyte contains one or more metal-ion charge carriers.

Suitable solvents include: a cyclic carbonate such as ethylene carbonate, propylene carbonate, butylene carbonate or vinylene carbonate; a non-cyclic carbonate such as dimethyl carbonate, diethyl carbonate, ethyl methyl carbonate or dipropyl carbonate; an aliphatic carboxylic acid ester such as methyl formate, methyl acetate, methyl propionate or ethyl propionate; a .gamma.-lactone such as y-butyrolactone; a non-cyclic ether such as 1,2-dimethoxyethane, 1,2-diethoxyethane or ethoxymethoxyethane; a cyclic ether such as tetrahydrofuran or 2-methyltetrahydrofuran; an organic aprotic solvent such as dimethylsulfoxide, 1,3-dioxolane, formamide, acetamide, dimethylformamide, dioxolane, acetonitrile, propylnitrile, nitromethane, ethyl monoglyme, phospheric acid triester, trimethoxymethane, a dioxolane derivative, sulfolane, methylsulfolane, 1,3-dimethyl-2-imidazolidinone, 3-methyl-2-oxazolidinone a propylene carbonate derivative, a tetrahydrofuran derivative, ethyl ether, 1,3-propanesultone, anisole, dimethylsulfoxide and N-methylpyrrolidone; and mixtures thereof. A mixture of a cyclic carbonate and a non-cyclic carbonate or a mixture of a cyclic carbonate, a non-cyclic carbonate and an aliphatic carboxylic acid ester, are preferred.

Suitable alkali metal salts, particularly lithium salts, include: $LiClO_4$; $LiBF_4$; $LiPF_6$; $LiAlCl_4$; $LiSbF_6$; LiSCN; $LiCF_3SO_3$; $LiCF_3CO_2$; $Li(CF_3SO_2)_2$; $LiAsF_6$; $LiN(CF_3SO//2)_2$; $LiB_{10}Cl_{10}$; a lithium lower aliphatic carboxylate; LiCl; LiBr; LiI; a chloroboran of lithium; lithium tetraphenylborate; lithium imides; LiBOB (lithium bis(oxalate)borate) and mixtures thereof. Preferably, the electrolyte contains at least $LiPF_6$.

One embodiment of the invention involves the production of a nanocrystalline and/or amorphous $VPO_4$. This material can be used a precursor for preparing various vanadium based products. This material is very reactive and allows for the preparation of various vanadium based products at low temperatures and with very fast kinetics. Additionally this $VPO_4$ is useful as a precursor of vanadium based products in that other processes for making the vanadium based products may cause production of unwanted impurity phases, such as $V_2O_3$, in the vanadium based products.

Figure 2:
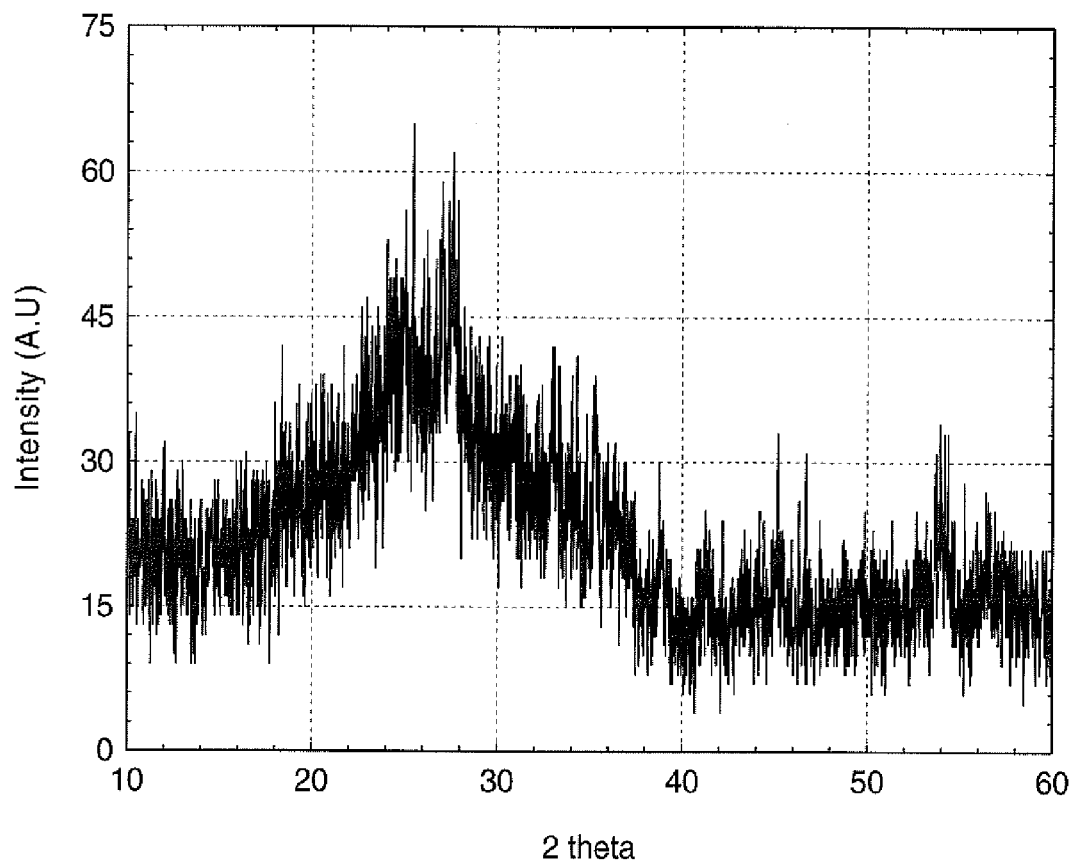
FIG. 2 is a representative X-ray pattern for a sample of an amorphous V—P—O/C sample prepared at 700° C. for 4 hours as in Example 1.

In another embodiment the invention involves the production of a amorphous V—P—O/C precursor with no "definite" composition (see FIG. 2). This V—P—O/C precursor has the correct ratio of V and $PO_4$ to make the final product (e.g. $LiVPO_4F$), is close to X-ray amorphous (see FIG. 2) and it contains finely divided and dispersed carbon. This material can be used a precursor for preparing various vanadium based products. This material is very reactive and allows for the preparation of various vanadium based products at low temperatures and with very fast kinetics. Additionally this V—P—O/C precursor is useful as a precursor of vanadium based products in that other processes for making the vanadium based products may cause production of unwanted impurity phases, such as $V_2O_3$, in the vanadium based products.

It is understood that the $VPO_4$ and V—P—O/C precursor materials can be used interchangeably in the reactions described herein. The V—P—O/C precursor is the preferred precursor. Thus where it is stated that $VPO_4$ is used the V—P—O/C precursor could alternately be used and vice versa. Alternatively, either precursor may be referred to as a vanadium phosphate precursor.

The vanadium phosphate precursor is made for example by mixing vanadium pentoxide ($V_2O_5$), ammonium hydrogen phosphate [$(NH_4)_2HPO_4$ or $(NH_4)H_2PO_4$] and a source of carbon, such as Enasco carbon. The mixture is then milled and/or micronized (i.e. some form of high energy mixing/homogenizing), pelletized and heated at a temperature in the range from about 400° C. to about 900° C. Preferably the milled mixture is heated in the temperature range from about 500° C. to about 800° C. and more preferably from about 600° C. to about 750° C. The mixture is heated from about 30 minutes to about 16 hours and more preferably from about 1 to about 8 hours.

The amorphous V—P—O/C precursors may be produced at temperatures from 300-800° C. and more preferably at about 600° C. Reaction of these preferred amorphous V—P—O/C precursors with appropriate alkali metal compounds result in improved vanadium phosphate products which can be produced at lower temperatures than when using the crystalline $VPO_4$ precursors.

The reaction proceeds according to the following equations:

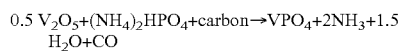

$$0.5\ V_2O_5 + (NH_4)_2HPO_4 + \text{carbon} \rightarrow VPO_4 + 2NH_3 + 1.5\ H_2O + CO$$

or

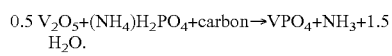

$$0.5\ V_2O_5 + (NH_4)H_2PO_4 + \text{carbon} \rightarrow VPO_4 + NH_3 + 1.5\ H_2O.$$

Alternatively other vanadium containing compounds such as $V_2O_3$, $VO_2$, $NH_4VO_3$ and the like can be used in the place of the $V_2O_5$. If lithium products are the desired end products $LiVO_3$ and the like may also be employed in place of the $V_2O_3$. Likewise, alternatively other phosphate sources such as $P_2O_5$, $H_3PO_4$ and the like can be used in place of the ammonium phosphate starting materials.

In one aspect, the source of carbon is provided by elemental carbon, preferably in particulate form such as graphites, amorphous carbon, carbon blacks and the like. In another aspect, the source of carbon may also be provided by an organic precursor material, or by a mixture of elemental carbon and organic precursor material. The organic precursor material will also be referred to in this application as an organic material. The organic material or organic precursor material is one that is capable of forming a decomposition product that contains carbon. The carbon is formed in situ.

Alternatively or in addition, the source of carbon may be provided by an organic material. The organic material is characterized as containing carbon and at least one other element, preferably hydrogen. The organic material generally forms a decomposition product, referred to herein as a carbonaceous material, upon heating under the conditions of the reaction.

The organic precursor material may be any organic material capable of undergoing pyrolysis or carbonization, or any other decomposition process that leads to a carbonaceous material rich in carbon. Such precursors include in general any organic material, i.e., compounds characterized by containing carbon and at least one other element. Although the organic material may be a perhalo compound containing essentially no carbon-hydrogen bonds, typically the organic materials contain carbon and hydrogen. Other elements, such as without limitation, halogens, oxygen, nitrogen, phosphorus, and sulfur, may be present in the organic material, as long as they do not significantly interfere with the decomposition process. One example of a preferred organic material is coke, which contains mostly carbon and hydrogen. Other precursors include, without limitation, organic hydrocarbons, alcohols, esters, ketones, aldehydes, carboxylic acids, sulfonates, and ethers. Preferred precursors include the above species containing aromatic rings, especially the aromatic hydrocarbons such as tars, pitches, and other petroleum products or fractions. As used here, hydrocarbon refers to an organic compound made up of carbon and hydrogen, and containing no significant amounts of other elements. Hydrocarbons may contain impurities having some heteroatoms. Such impurities might result, for example, from partial oxidation of a hydrocarbon or incomplete separation of a hydrocarbon from a reaction mixture or natural source such as petroleum.

Other organic precursor materials include sugars and other carbohydrates, including derivatives and polymers. Examples of polymers include, without limitation, starch, cellulose, and their ether or ester derivatives. Other derivatives include, without limitation, the partially reduced and partially oxidized carbohydrates discussed below. On heating, carbohydrates readily decompose to form carbon and water. The term carbohydrates as used here encompasses the D-, L-, and DL-forms, as well as mixtures, and includes material from natural or synthetic sources.

In one sense as used in the invention, carbohydrates are organic materials that can be written with molecular formula $(C)_m(H_2O)_n$, where m and n are integers. For simple hexose or pentose sugars, m and n are equal to each other. Non-limiting examples of hexoses of formula $C_6H_{12}O_6$ include allose, altose, glucose, mannose, gulose, inose, galactose, talose, sorbose, tagatose, and fructose. Pentoses of formula $C_5H_{10}O_5$ are represented by, without limitation, ribose, arabinose, and xylose. Tetroses include erythrose and threose, while glyceric aldehyde is a triose. Other carbohydrates include the two-ring sugars (di-saccharides) of general formula $C_{12}H_{22}O_{11}$. Examples include, without limitation, sucrose, maltose, lactose, trehalose, gentiobiose, cellobiose, and melibiose. Three-ring (trisaccharides such as raffinose) and higher oligomeric and polymer carbohydrates may also be used. Non-limiting examples include starch and cellulose. As noted above, the carbohydrates readily decompose to carbon and water when heated to a sufficiently high temperature. The water of decomposition tends to turn to steam under the reaction conditions and volatilize.

It will be appreciated that other materials will also tend to readily decompose to $H_2O$ and a material very rich in carbon. Such materials are also intended to be included in the term "carbohydrate" as used in the invention. Such materials include slightly reduced carbohydrates such as, without limitation, glycerol, sorbitol, mannitol, iditol, dulcitol, talitol, arabitol, xylitol, and adonitol, as well as "slightly oxidized" carbohydrates such as, without limitation, gluconic, mannonic, glucuronic, galacturonic, mannuronic, saccharic, manosaccharic, ido-saccharic, mucic, talo-mucic, and allomucic acids. The formula of the slightly oxidized and the slightly reduced carbohydrates is similar to that of the carbohydrates.

A preferred carbohydrate is sucrose. Under the reaction conditions, sucrose melts at about 150-180° C. The liquid melt tends to distribute itself among the starting materials. At temperatures above about 450° C., sucrose and other carbohydrates decompose to form carbon and water. The as-decomposed carbon powder is in the form of fresh amorphous fine particles with high surface area and high reactivity.

The organic precursor material may also be an organic polymer. Organic polymers include without limitation, polyolefins such as polyethylene and polypropylene, butadiene polymers, isoprene polymers, vinyl alcohol polymers, furfuryl alcohol polymers, styrene polymers including polystyrene, polystyrene-polybutadiene and the like, divinylbenzene polymers, naphthalene polymers, phenol condensation products including those obtained by reaction with aldehyde, polyacrylonitrile, polyvinyl acetate, as well as cellulose starch and esters and ethers thereof described above.

In some embodiments, the organic precursor material is a solid available in particulate form. Particulate materials may be combined with the other particulate starting materials and reacted by heating according to the methods described above.

In other embodiments, the organic precursor material may be a liquid. In such cases, the liquid precursor material is combined with the other particulate starting materials to form a mixture. The mixture is heated, whereupon the organic material forms a carbonaceous material in situ. The liquid precursor materials may also advantageously serve or function as a binder in the starting material mixture as noted above.

In an alternative embodiment of the invention the vanadium phosphate precursor is made for example by mixing vanadium pentoxide ($V_2O_5$), ammonium hydrogen phosphate [$(NH_4)_2HPO_4$ or $(NH_4)H_2PO_4$]. The mixture is then milled and/or micronized (i.e. some form of high energy mixing/homogenizing), pelletized and heated at a temperature in the range from about 400° C. to about 900° C. in the presence of reducing gas or gases. Non-limiting examples or reducing gases include hydrogen, methane, ammonia and carbon monoxide. The reducing atmosphere may be provided as pure reducing gas, or as mixtures of reducing gas with other gases. Non-limiting examples of reducing atmosphere mixtures include hydrogen-argon, hydrogen-nitrogen, carbon monoxide-hydrogen, carbon monoxide-argon, and the like. The reducing gas may but need not be provided in molar excess. The reducing gas may be used in partial pressures from about 0.01 atmosphere up to super-atmospheric, depending on such factors as the size of the sample, the volume of the heating chamber, and the excess of gas, if any, required for the reaction In an alternate embodiment the reaction is carried out in a reducing atmosphere in the presence of a reductant. Such reductant includes, without limitation carbon and organic precursor materials as discussed above. Such reducing atmosphere, includes without limitation, the reducing gases and mixtures thereof discussed above.

In one embodiment of the invention the vanadium phosphate precursor is mixed with an alkali metal containing compound and optionally with another metal containing compound to produce alkali metal vanadium phosphate compounds. By way of example alkali metal containing compounds include NaF, LiF, $LiH_2PO_4$, NaOH, $Na_2CO_3$, $Li_3PO_4$ and the like and mixtures thereof. If the desired end product is a fluorophosphate (e.g. $NaVPO_4F$, $LiVPO_4F$) suitable precursors can include $NH_4F$ and the like together with an appropriate alkali ion salt. Preferred alkali metal containing compounds are compounds containing Na or Li and the more preferred alkali metal containing compounds contain Li. The optional metal containing compounds are compounds containing a metal ion selected from the group consisting of Al, Ti, Cr, Fe Mn, Mo, Nb and the like. Examples of such metal containing compounds include for example $AlPO_4$, $Fe_2O_3$, $Mn_2O_3$, $Fe_3O_4$, FeO, $MnO_2$, MnO, $CrPO_4$, $FePO_4$ $MnPO_4$, aluminum hydroxide, aluminum oxide, aluminum carbonate, $Cr_2O_3$, $Nb_2O_5$ and the like.

The vanadium phosphate precursors are then reacted with an appropriate alkali metal according to, for example the following reactions:

$$3\ LiH_2PO_4 + 2\ VPO_4 \rightarrow Li_3V_2(PO_4)_3 + 3H_2O$$

or $$VPO_4 + LiF \rightarrow LiVPO_4F$$

or $$3\ NaF + 2\ VPO_4 \rightarrow Na_3V_2(PO_4)_2F_3.$$

The alkali metal compound is a compound of lithium, sodium, or potassium. The alkali metal compound serves as a source of alkali metal ion in particulate form. Preferred alkali metal compounds are sodium compounds and lithium compounds. Examples of compounds include, without limitation, carbonates, metal oxides, hydroxides, sulfates, aluminates, phosphates and silicates. Examples of lithium compounds thus include, without limitation, lithium carbonates, lithium metal oxides, lithium mixed metal oxides, lithium hydroxides, lithium aluminates, and lithium silicates, while analogous sodium compounds are also preferred. A preferred lithium compound is lithium carbonate. Sodium carbonate and sodium hydroxide are preferred sodium compounds.

Typically the $VPO_4$ precursor, alkali metal containing compound and optional other metal containing compound are milled and then pelletized. The mixture is then heated at a temperature from about 500° C. to about 900° C. More preferably the mixture is heated from about 500° C. to about 800° C. and most preferably from about 600° C. to about 750° C. The mixture is heated for about 30 minutes to about 16 hours and more preferably from about 1 to about 8 hours.

The reaction produces electrode active compounds represented by the nominal general formula (I):

$$A_a V_{1-x} M_x (PO_4)_d Z_f \qquad (I)$$

wherein A is selected from the group consisting of Li, Na, K and mixtures thereof;
a is greater than 0.1 and less than or equal to 3;
x is zero or less than 1;
d is greater than 0 and less than or equal to 3
M is a metal selected from the group consisting of Al, Ti, Cr, Fe, Mn, Mo, Nb and mixtures thereof;
Z is F, Cl, or OH:
and f is greater than or equal to 0 but less than or equal to 3.

Examples of such compounds include but are not limited to $LiVPO_4$, $LiV_{1-x}Al_xPO_4F$, $Na_xVPO_4F_x$, $Li_{0.1}Na_{0.9}VPO_4F$, $NaVPO_4F$, $NaVPO_4OH$, $NaVPO_4F$, $Li_3V_2(PO_4)_3$, $LiV_{0.75}Al_{0.25}PO_4F$, $LiV_{0.5}Al_{0.5}PO_4F$, $Na_{1.2}VPO_4F_{1.2}$ and $Na_3V_2(PO_4)_2F_3$, and the like.

In another embodiment of the invention the reaction produces electrode active compounds represented by the nominal general formula (I):

$$A_a V_{1-x} M_x P_2 O_7 \qquad (I)$$

wherein A is selected from the group consisting of Li, Na, K and mixtures thereof;
a is greater than 0.1 and less than or equal to 3;
x is greater than or equal 0 and less than 1; and
M is a metal selected from the group consisting of Al, Ti, Cr, Cr, Fe, Mn, Mo, Nb and mixtures thereof. An example of such electrode active material includes, but is not limited to $LiVP_2O_7$.

The electrode active materials described herein are in their nascent or as-synthesized state, prior to undergoing cycling in an electrochemical cell. The components of the electrode active material are selected so as to maintain electroneutrality of the electrode active material. The stoichiometric values of one or more elements of the composition may take on non-integer values.

In all embodiments described herein, moiety Z (when provided) is selected from the group consisting of OH (hydroxyl), a halogen, or mixtures thereof. In one embodiment, Z is selected from the group consisting of OH, F (Fluorine), Cl (Chlorine), and mixtures thereof. In another embodiment, Z is OH. In another embodiment, Z is F, or a mixture of F with OH or Cl.

Typically for electrochemical testing, composite electrodes were fabricated using 84-wt % active material, 6-wt % Super P (conductive carbon) and 10-wt % PVdf-H FP copolymer (Elf Atochem) binder. The electrolyte comprised a 1M $LiPF_6$ solution in ethylene carbonate/dimethyl carbonate (2:1 by weight) while a dried glass fiber filter (Whatman, Grade GF/A) was used as the electrode separator. A commercially available crystalline graphite or lithium metal foil were used as the anode active material. High-resolution electrochemical measurements were performed using the Electrochemical Voltage Spectroscopy (EVS) technique. (J. Barker, Electrochim. Acta, 40, 1603 (1995)). EVS is a voltage step method, which provides a high resolution approximation to the open circuit voltage curve for the electrochemical system under investigation. Cycling tests of the hybrid-ion cells were performed using a commercial battery cycler (Maccor Inc., Tulsa, Okla., USA).

The following non-limiting examples illustrate the compositions and methods of the present invention.

EXAMPLE 1

Preparation of $VPO_4$ $VPO_4$ was prepared according to the following reaction:

$$\tfrac{1}{2}V_2O_5+(NH_4)_2HPO_4+1.0\ C \rightarrow VPO_4+2\ NH_3+3/2\ H_2O+CO$$

9.1 g $V_2O_5$, 13.2 g of $(NH_4)_2HPO_4$ and 1.32 g of carbon (10% mass excess) were used. Carbon was added to the reaction mixture so that the $V^{5+}$ in the $V_2O_5$ was reduced to $V^{3+}$ in the product which is an example of carbothermal reduction. The excess carbon in the product helps act as a conducting agent in the vanadium phosphate electroactive materials produced therefrom, which improves the electrochemical properties of such electroactive materials.

It has been found that it is necessary to use a homogenous starting material. This can be achieved using high energy milling methods, which can include ball milling and micronizing. The sample prepared herein were prepared using McCrone micronizers to obtain the starting materials.

The $VPO_4$ materials prepared herein were prepared at a number of different temperatures in the range from about 650° C. to about 900° C. The samples prepared at higher temperatures contained $V_2O_3$ as an impurity. Such materials would be unsuitable as precursors since $V_2O_3$ is known to be detrimental to the electrochemical performance in Li ion cells. It has been found that preparing these materials at low temperatures, typically about 700° C. for about 4 to about 16 hours under a flowing argon atmosphere can be used effectively for the preparation of a number of precursor materials. The precursor materials on removal from the furnace range from dark brown to black in color. The color is dependent on the amount of carbon added in the initial reaction mixture.

FIG. 2 is a typical X-ray powder pattern obtained for a sample of V—P—O/C precursor made at 700° for 4 hours. The powder pattern of these materials prepared at low temperature generally have a "featureless" powder pattern, which can be interpreted as being due to either the material being amorphous or that the obtained crystallites are very small nanoparticles.

EXAMPLE 2

Preparation of $LiVPO_4F$ using $VPO_4$ $LiVPO_4$ was prepared according to the following reaction:

$$LiF+VPO_4 \rightarrow LiVPO_4F$$

The LiF (2.6 g) and $VPO_4$ (1.46 g) were mixed and micronized. The amount of LiF added is dependent on the amount of residual carbon present in the $VPO_4$. The stoichiometric amount of LiF is added based on the above reaction. An allowance can be made for the amount of residual carbon left over from the V—P—O/C synthesis. This is normally about 3 weight percent. The mixture was then heated in the temperature range of about 600° to about 700° C. for up to about 1 hour. At temperatures in excess of 700° C., it is believed that $VF_3$ sublimation occurs which leads to the formation of $Li_3V_2(PO_4)_3$ (LVP-nasicon).

Figure 3:
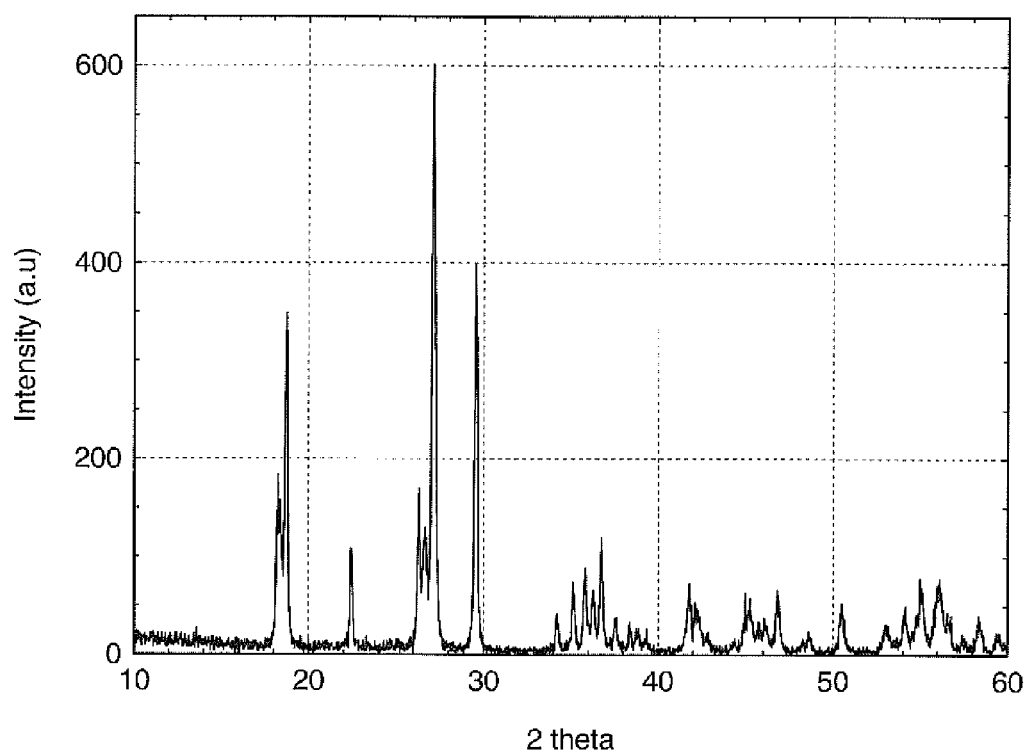
FIG. 3 is an X-ray powder pattern for a sample of $LiVPO_4F$ for a product prepared according to Example 2.

FIG. 3 shows an example of a powder pattern obtained for a sample of $LiVPO_4F$. Refinement of the XRD data for the $LiVPO_4F$ samples was carried out using the Rietveld method. H. M. Rietveld, J. Appl. Crystallograph, 2, (1969) 65. R. A. Young in "The Rietveld Method", Chapter 1, Oxford Science Publications. A. C. Larsen and R. B. Von Dreele, Los Alamos Laboratory Report, NO-LA-U-86-746 (1987). The X-ray data can be satisfactorily refined using a structural model based on either Tavorite, $LiFePO_4OH$ (U.S. Pat. No. 6,387,568 Barker et al.) or Amblygonite, $LiAlPO_4F$ (Groat et al, American Mineralogist, 88, 195 (2003). The X-ray data for the $LiVPO_4F$ samples derived from the optimized synthesis conditions for this process favor the Amblygonite structural model as the most likely structure of this model. (Such optimized conditions being V—P—O/C prepared at 700° C., followed by reaction with LiF at 700° C. to produce $LiVPO_4$).

Figure 4:
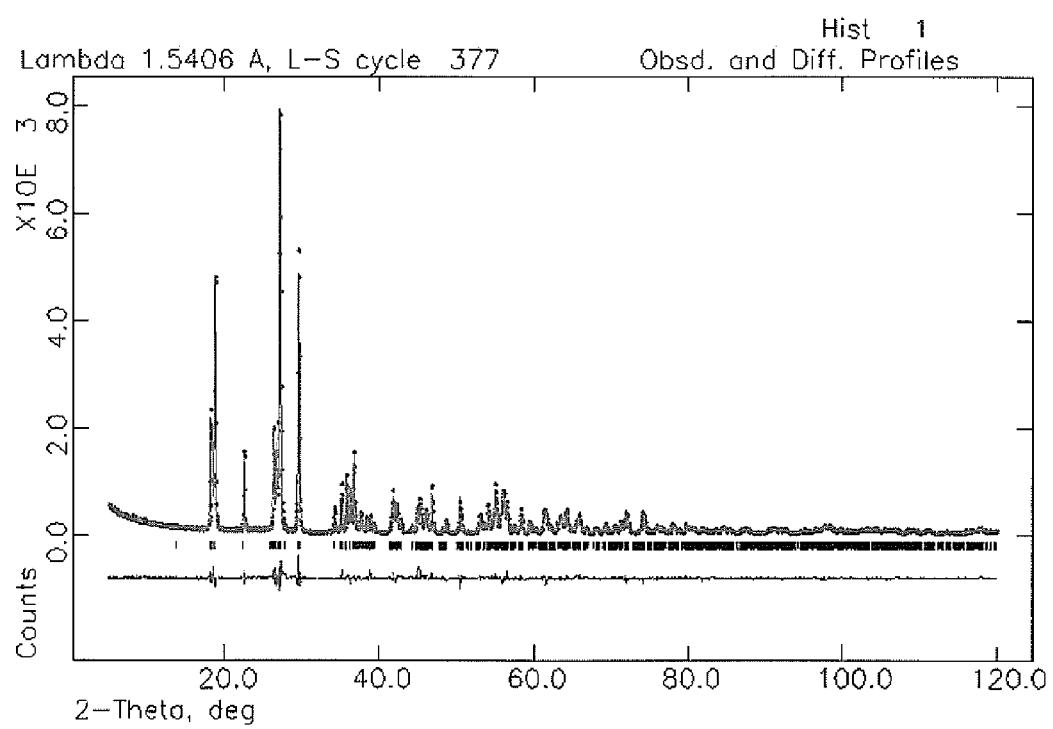
FIG. 4 is observed, difference and calculated plot obtained from Rietveld analysis of an optimized sample of $LiVPO_4F$ prepared in Example 2.

FIG. 4 shows the fit obtained for the $LiVPO_4F$ sample using the Rietveld analysis. The refined cell parameters are given as space group P-1: a=5.16727(13) Å, b=5.30590 (13) Å, c=7.28964(19) Å, α=108.9108(14)°, β=107.2137 (13)°, γ=98.4002(16)° and cell volume=174.007(8) Å$^3$; with fitting statistics being $R_{wp}$ 11.08%, $R_p$=8.05% and x=2.352.

Figure 5:
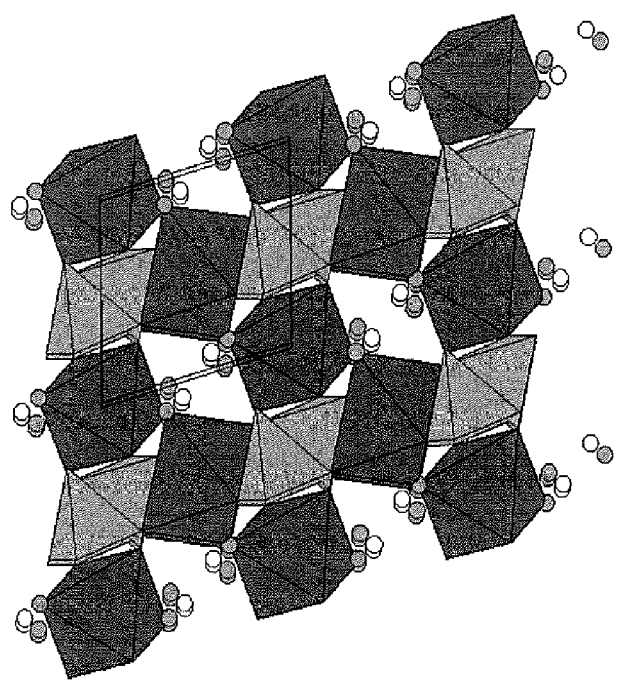
FIG. 5 shows a schematic representation of the structure of $LiVPO_4F$ projected down the c-axis.

FIG. 5 shows a schematic representation (along the c axis) of the $LiVPO_4F$ based on the Amblygonite structural model. The $LiVPO_4F$ structure comprises a three dimensional framework being built from $[PO_4]$ tetrahedral and $[VO_4F_2]$ octahedral with the oxygen atoms shared between the $PO_4$ and $VO_4F_2$. This model predicts the presence of two distinct crystallographic sites for alkali ions which explains the electrochemical lithium extraction behavior exhibited by this material.

An electrode is made with 84% of the active material, 6% of Super P conductive carbon, and 10% poly vinylidene difluoride. A cell with that electrode as cathode and lithium anode is constructed with an electrolyte comprising 1 M $LiPF_6$ dissolved in 2:1 by weight mixture of ethylene carbonate:dimethyl carbonate.

Figure 6:
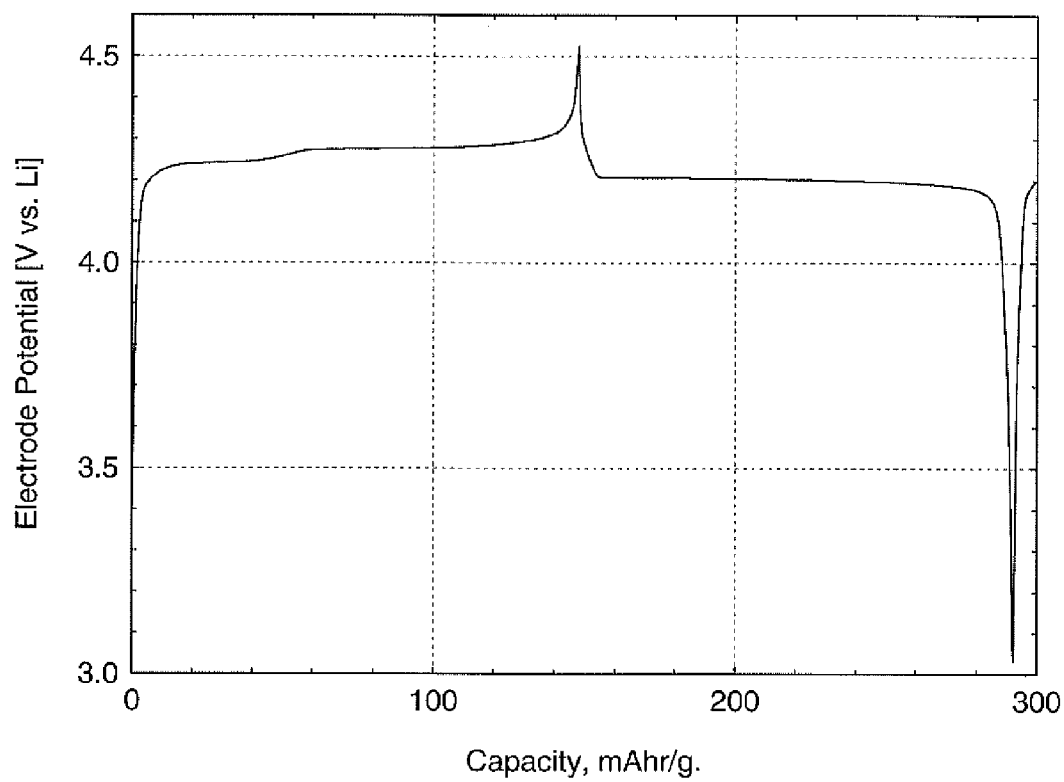
FIG. 6 shows the first cycle current data for a Li/$LiVPO_4F$ cell made with the $LiVPO_4F$ prepared in Example 2.

FIG. 6 shows the first cycle constant current data obtained for the cell built using the sample of $LiVPO_4F$. A slight inflection is seen in the data during the charge process, which is related to preferential depopulation of one of the Li sites within the structure. No such feature is observed during the discharge process, indicating that during reinsertion of the Li neither of the sites is preferred. This observation is clearly supported by the observation of two peaks in the differential capacity plot obtained during EVS measurement. Long term cycling of this material shows good electrochemical properties.

EXAMPLE 3

An electrode active material comprising $LiV_{1-x}Al_xPO_4F$ was made according to the following reaction scheme:

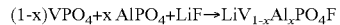

$$(1-x)VPO_4 + x\,AlPO_4 + LiF \rightarrow LiV_{1-x}Al_xPO_4F$$

The LiF, $VPO_4$ and $AlPO_4$ were mixed and micronized in the required amounts. If for example x=0.2

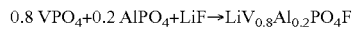

$$0.8\,VPO_4 + 0.2\,AlPO_4 + LiF \rightarrow LiV_{0.8}Al_{0.2}PO_4F$$

Then 1.167 g of $VPO_4$ were mixed with 0.244 g $AlPO_4$ and 0.259 g LiF. The mixture was then heated in the temperature range 600-700° C. for up to 1 hour.

An electrode is made with 84% of the active material, 6% of Super P conductive carbon, and 10% poly vinylidene difluoride. A cell with that electrode as cathode and a lithium anode is constructed with an electrolyte comprising 1 M $LiPF_6$ dissolved in 2:1 by weight mixture of ethylene carbonate:dimethyl carbonate.

Figure 7:
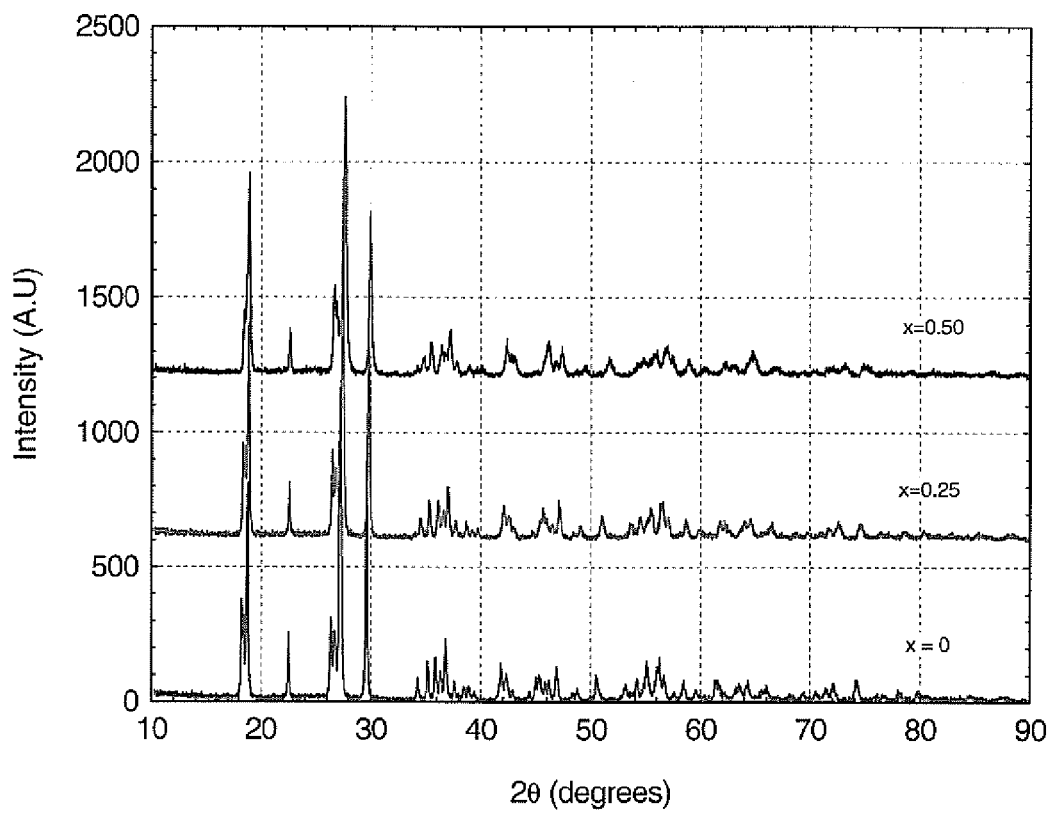
FIG. 7 shows a representative X-ray powder patterns for $LiV_{1-x}Al_xPO_4F$ made by the process according to Example 3.

FIG. 7 shows the X-ray powder patterns for samples of $LiV_{1-x}Al_xPO_4F$. The results shown in FIG. 7 show that high quality samples can be prepared relatively easily.

Figure 8:
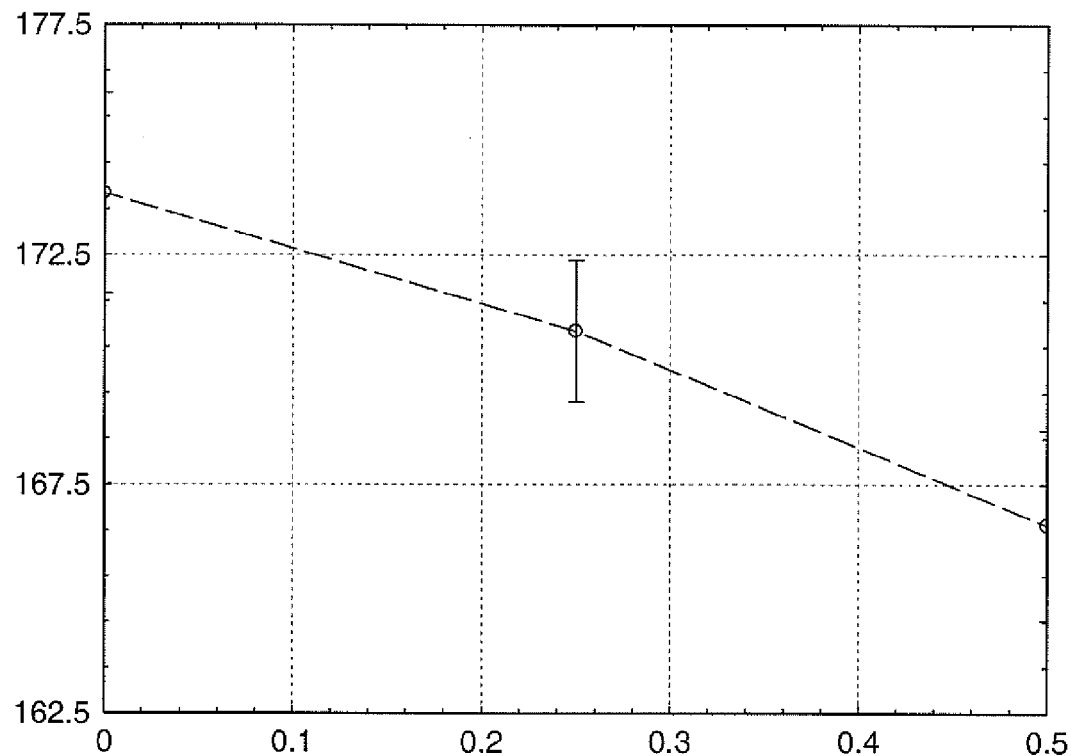
FIG. 8 shows the unit cell volume versus Al content for $LiV_{1-x}Al_xPO_4F$ made by the process according to Example 3.

FIG. 8 is a plot of Al content versus unit cell volume, obtained from Rietveld analysis of several samples. The plot clearly shows a linear relationship between Al content and the unit cell volume which is consistent with Vegards law, i.e. formation of a solid solution series between the V and Al.

Figure 9:
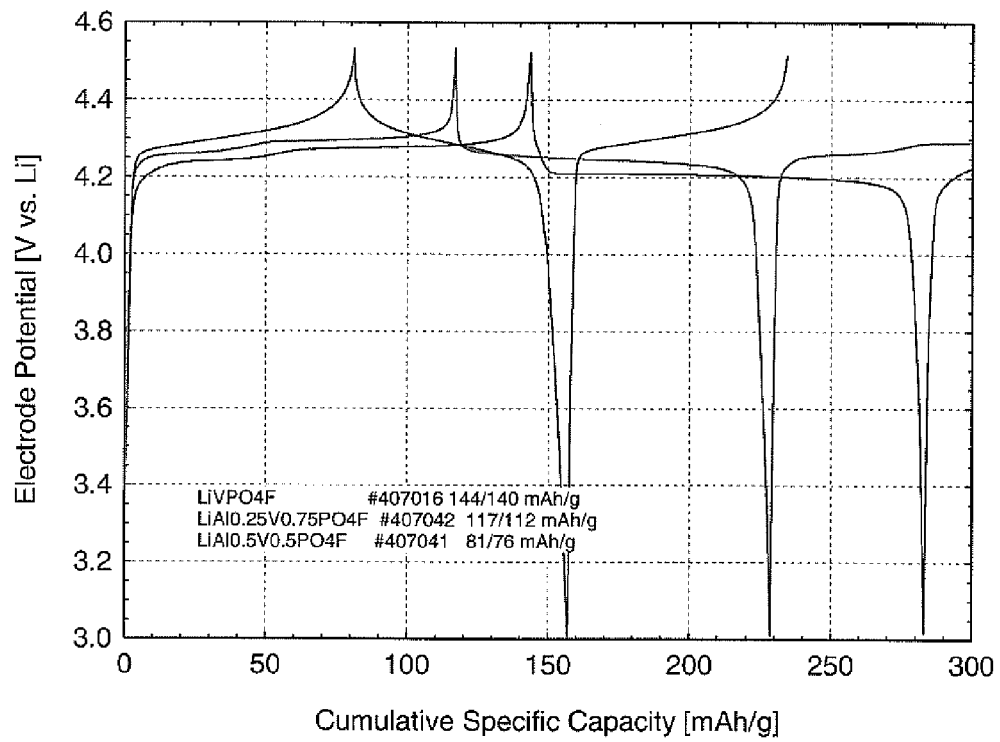
FIG. 9 shows a comparison of the electrochemical response of Li/$LiVPO_4F$, Li/$LiAl_{0.25}V_{0.75}PO_4F$ and Li/$LiAl_{0.5}V_{0.5}PO_4F$ cells made by the process of Example 3.

Varying the amount of Al in a sample makes it possible to vary the operating voltage of the sample. FIG. 9 shows a comparison of the electrochemical response of samples containing varying amounts of Al. Addition of more Al to a sample has the effect of reducing the overvoltage (i.e. voltage polarization) and is thought to be related to the increase in substitutionial disorder of the material. The addition of Al on the V sites upsets the ordering (V-V-etc) of the transition metal. This will affect the resultant voltage characteristics to some extent. However, as Al is electrochemically inactive it has the effect of reducing the overall capacity of the material. Life cycling data suggests that the Al doped samples have a lower fade rate then observed with $LiVPO_4F$.

EXAMPLE 4

An electrode active material comprising $Na_{1.2}VPO_4F_{1.2}$ was made as follows. In a first step, a metal phosphate was made by carbothermal reduction of a metal oxide, here exemplified by vanadium pentoxide. The overall reaction scheme of the carbothermal reduction is as follows.

$$0.5V_2O_5 + NH_4H_2PO_4 + C \rightarrow VPO_4 + NH_3 + 1.5H_2O + CO$$

9.1 grams of $V_2O_5$, 11.5 grams of $NH_4H_2PO_4$ and 1.2 grams of carbon (10% excess) are used. The precursors were pre-mixed using a mortar and pestle and then pelletized. The pellet was transferred to an oven equipped with a flowing argon atmosphere. The sample was heated at a ramp rate of 2° per minute to an ultimate temperature of 300° C. and maintained at this temperature for three hours. The sample was cooled to room temperature, removed from the oven, recovered, re-mixed and repelletized. The pellet is transferred to a furnace with an argon atmosphere. The sample is heated at a ramp rate of 2° per minute to an ultimate temperature 750° C. and maintained at this temperature for 8 hours.

In a second step, the vanadium phosphate made in the first step was reacted with an alkali metal halide, exemplified by sodium fluoride, according to the following reaction scheme.

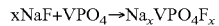

$$xNaF + VPO_4 \rightarrow Na_xVPO_4F_x$$

14.6 grams of $VPO_4$ and 4.2 grams of NaF were used. The precursors are pre-mixed using a mortar and pestle and then pelletized. The pellet was transferred to an oven equipped with a flowing argon atmosphere. The sample was heated at a ramp rate of 2° per minute to an ultimate temperature of 750° C. and maintained at this temperature for an hour. The sample was cooled and removed from the furnace.

To make $Na_{1.2}VPO_4F_{1.2}$, the reaction is repeated with a 20% mass excess of sodium fluoride over the previous reaction. The precursors were pre-mixed using a mortar and pestle and pelletized as before. The sample was heated to an ultimate temperature of 700° C. and maintained at this temperature for 15 minutes. The sample was cooled and removed from the oven. There is only a small weight loss during reaction, indicating almost full incorporation of the NaF. To make an active material of formula $Na_{1.5}VPO_4F_{1.5}$ the reaction is repeated with an approximate 50% mass excess of sodium fluoride over the first reaction. The sample is heated at 700° C. for 15 minutes, cooled, and removed from the oven.

An electrode is made with 84% of the active material, 6% of Super P conductive carbon, and 10% poly vinylidene difluoride. A cell with that electrode as cathode and lithium foil as anode is constructed with an electrolyte comprising 1 M $LiPF_6$ dissolved in 2:1 by weight mixture of ethylene carbonate:dimethyl carbonate.

EXAMPLE 5

An electrode active material comprising $LiVP_2O_7$ was made according to the following reaction scheme.

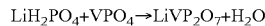

$$LiH_2PO_4 + VPO_4 \rightarrow LiVP_2O_7 + H_2O$$

$LiH_2PO_4$ (10.39 g) and $VPO_4$ (14.59 g) were used. The precursors were mixed using a mortar and pestle and then pelletized. The pellet was transferred to an oven equipped with a flowing argon atmosphere. The sample was heated at a ramp rate of 2° per minute to an ultimate temperature of 750° C. and maintained at this temperature for an hour. It has been found that this material can be prepared in temperatures ranging from about 650° C. to about 850° C. The sample is cooled and removed from the furnace.

An electrode is made with 84% of the active material, 6% of Super P conductive carbon, and 10% poly vinylidene difluoride. A cell with that electrode as cathode and carbon intercalation anode is constructed with an electrolyte comprising 1 M $LiPF_6$ dissolved in 2:1 by weight mixture of ethylene carbonate:dimethyl carbonate.

Figure 10:
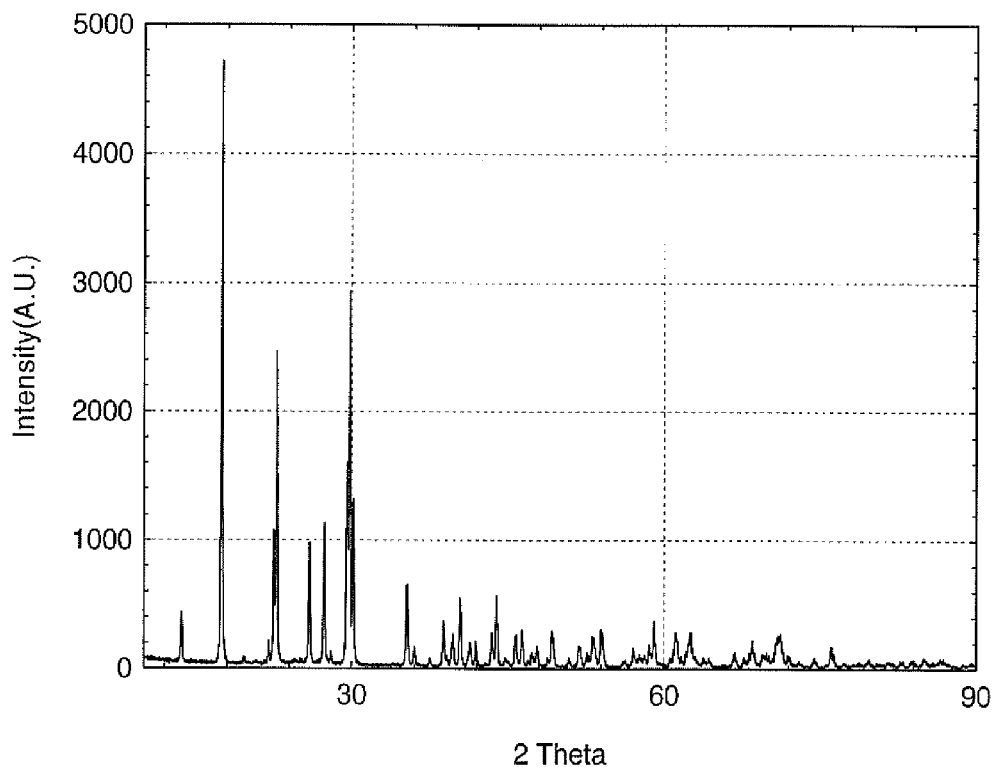
FIG. 10 shows a representative X-ray powder pattern for $LiVP_2O_7$ made by the process of Example 5.
Figure 11:
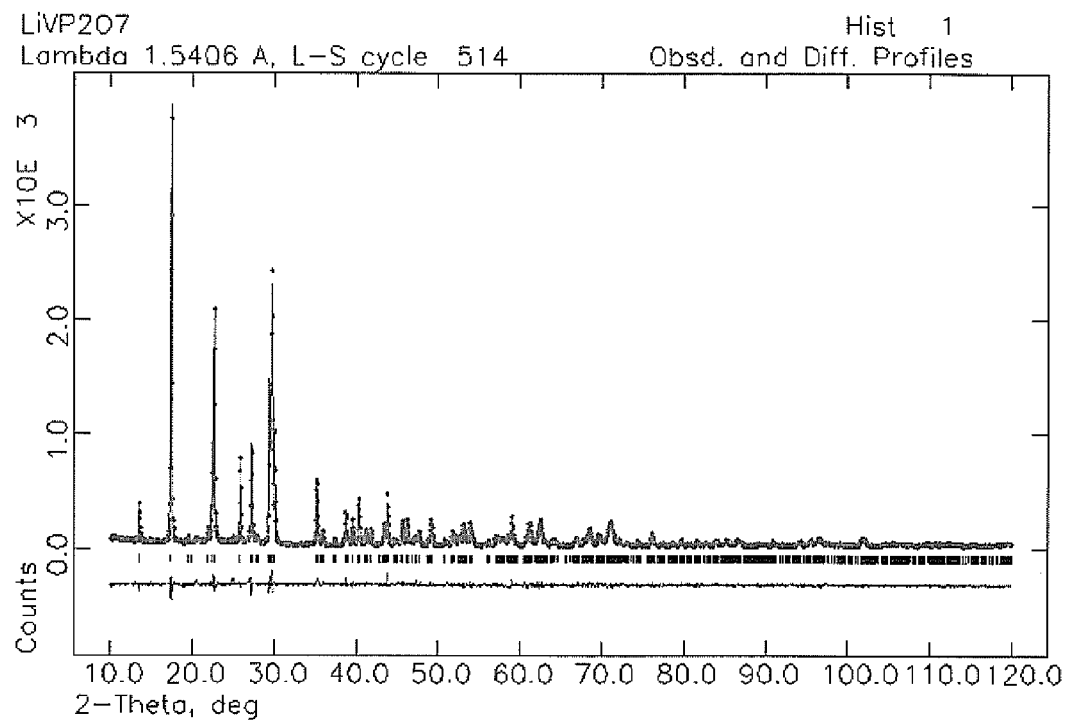
FIG. 11 shows the observed, difference and calculated plots obtained for a sample of $LiVP_2O_7$ made by the process of Example 5.

FIG. 10 is a representative X-ray powder pattern for $LiVP_2O_7$. The structure of this material has been examined using the Rietveld method using the model presented by Rousse. Rousse et al., *Int. J. Inorg. Mat.*, 3, 881 (2001). The obtained fit is presented in FIG. 11. The refined unit cell lattice parameters are: a=4.8211(2) Å, b=8.1283(3) Å, c=6.9404(3) Å, α=90°, β=108.949(2)°, γ=90°, volume=257.24(2) Å$^3$ with $R_{wp}$=12.97%, $R_p$=9.23% and $x^2$=1.30.

Figure 12:
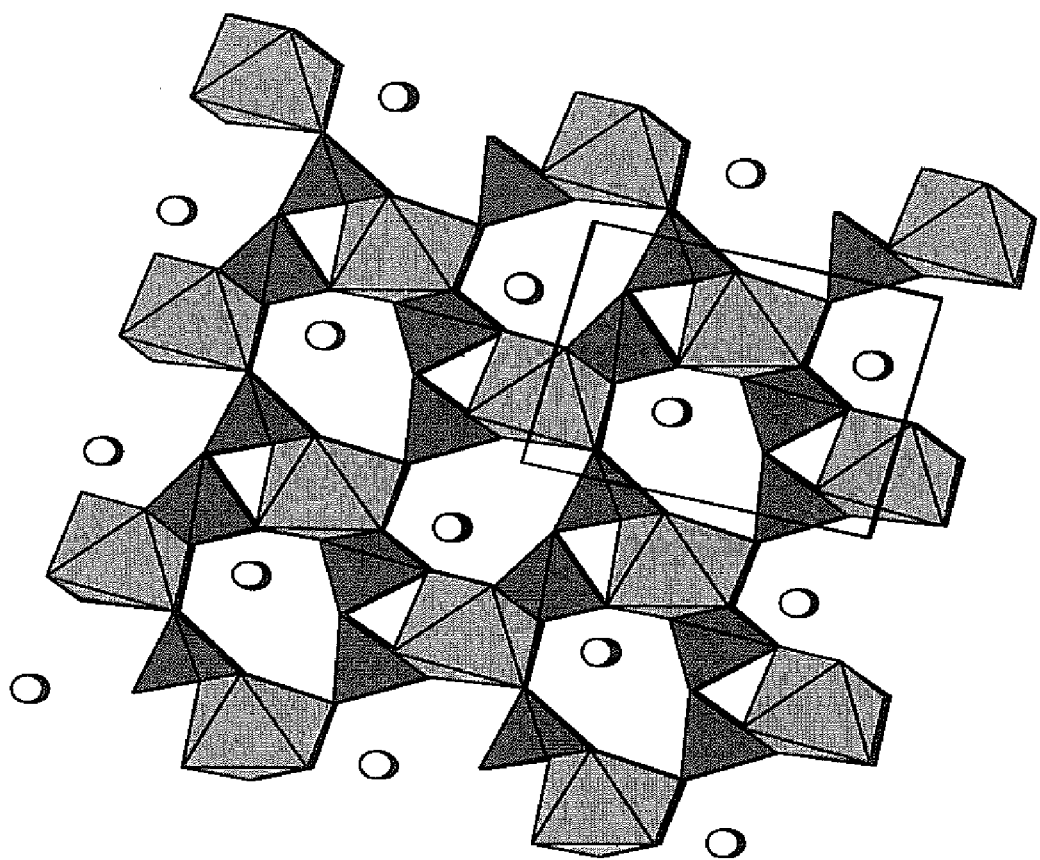
FIG. 12 shows a schematic representation of the structure of $LiVP_2O_7$ made by the process of Example 5.

The structure of $LiVP_2O_7$ can be described as a 3-D framework of corner sharing $VO_6$ octahedra and $P_2O_7$ groups. This framework arrangement provides tunnels in which Li ions are coordinated tetrahedrally, as shown in FIG. 12.

Previous studies by Uebou and Wurm have shown that this material has relatively poor electrochemical properties, with discharge capacities in the region of 50 mAh/g observed at a very low rate (typically a very low rate). Uebou et al., *Solid State Ionics*, 148, 323, (2002). Wurm et al., *Chem. Mater.*, 14, 2701, (2002). The present inventors have found that by producing a composite of this diphosphate and a high surface area carbon, there is a noticeable improvement in the electrochemical properties. The properties are shown in FIG. 13.

Figure 13:
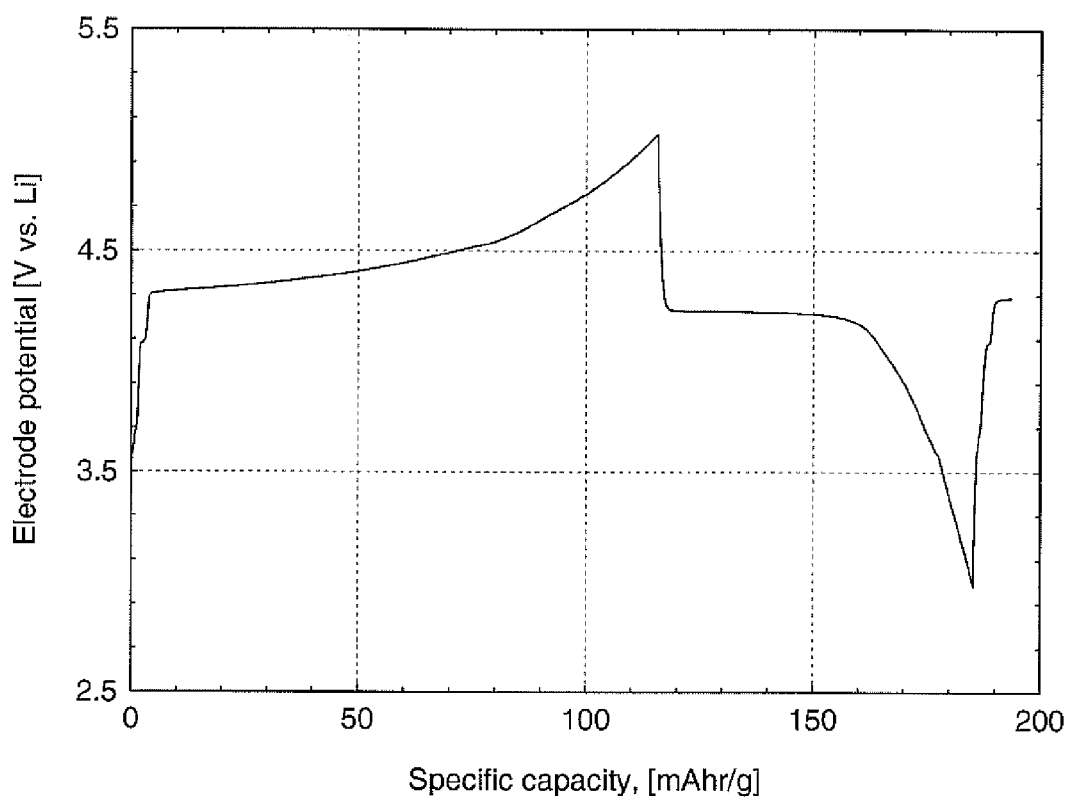
FIG. 13 shows a first cycle constant current data for a $Li/LiVP_2O_7$ cell.

The data in FIG. 13 shows a discharge capacity in the region of about 68 MAh/g. Taking into account the residual carbon this discharge capacity has a value closer to about 71 mAh/g. Although this would appear to be only a modest improvement over that reported by Uebou and Wum, these experiments were performed at a rate in the region of C/15. It is believed that some of the irreversibility is due to the upper voltage limit used in this experiment.

Figure 14:
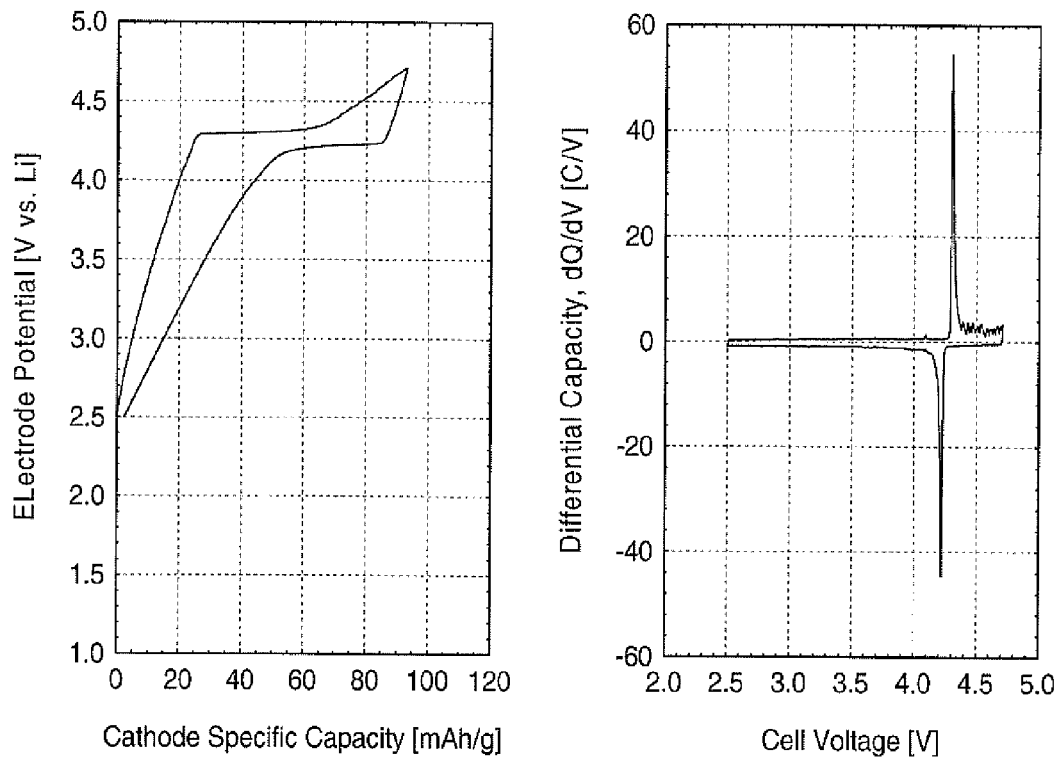
FIG. 14 shows EVS data for a representative $Li/LiVP_2O_7$ cell cycled between 2.5-4.7 V. Left: EVS Voltage profile. Right: EVS Differential Capacity Profile.

FIG. 14 shows the results of an EVS experiment performed using voltage limits of 2.5 to 4.7 volts (versus Li). The reversible specific capacity for $LiVP_2O_7$ is 93 mAh/g. It was noted however, that the capacity increased slowly over the first ten cycles, reaching 101 mAh/g after the tenth cycle. Examination of the differential capacity versus cell voltage plot shows that this system works with relatively low polarization. The differential capacity plot shows some evidence of decomposition at voltages greater than approximately 4.35 volts.

Figure 15:
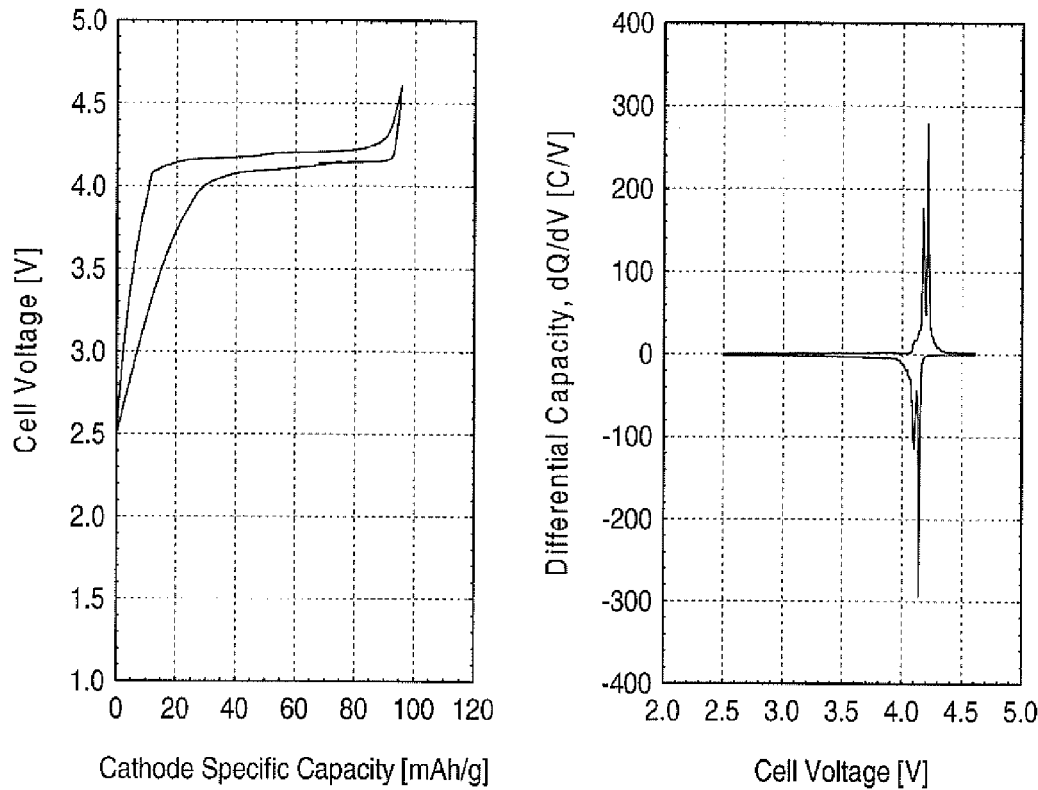
FIG. 15 shows EVS data for a representative graphite// $LiVP_2O_7$ lithium ion cell cycled between 2.5-4.6 V. The data shown is for the tenth cycle. Left: EVS Voltage Profile. Right EVS Differential Capacity Profile.
Figure 16:
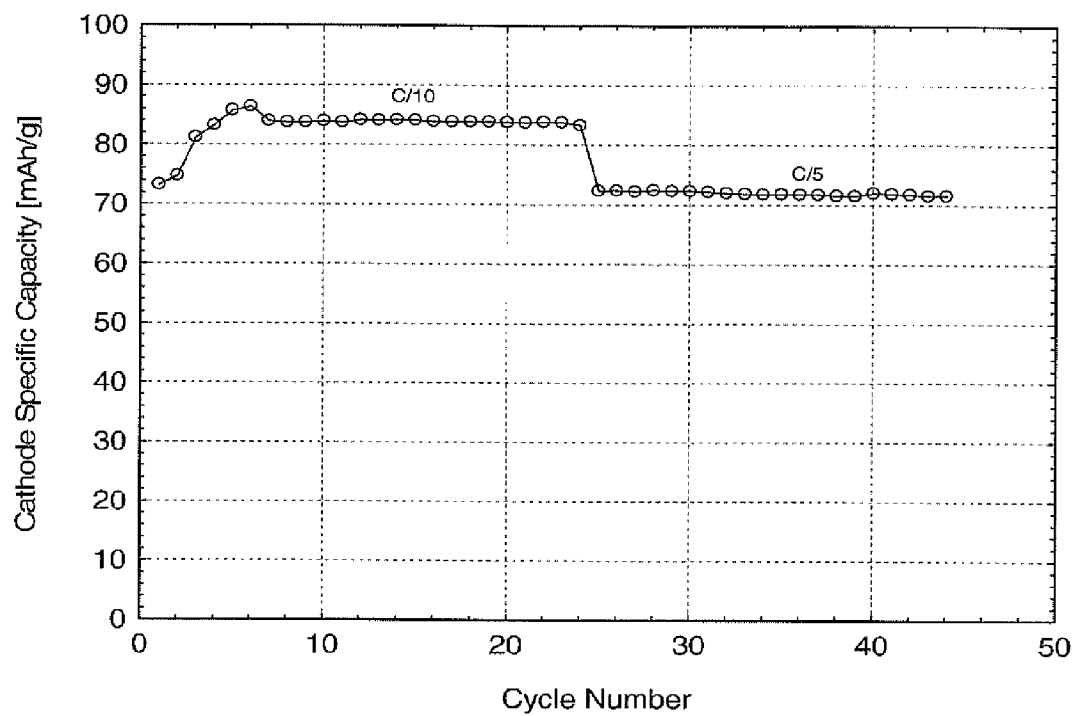
FIG. 16 shows the life cycle data collected for $LiVP_2O_7$// graphite cell.

Similarly, good results have been obtained in Li ion cells, with EVS results after 10 cycles shown in FIG. 15. It can be seen therefrom that there is a decrease in observed cell polarization. FIG. 16 shows the results of life cycle experiments performed with this material.

EXAMPLE 6

An electrode active material comprising $Li_{0.1}Na_{0.9}VPO_4F$ was made according to the following reaction scheme.

$xLiF+(1-x)NaF+VPO_4 \rightarrow Li_xNa_{1-x}VPO_4F$

As an alternative to using alkali fluorides, a reaction between $VPO_4$ and $NH_4F$ and a mixture of $Li_2CO_3$ and $Na_2CO_3$ may also be used.

To make $Li_{0.1}Na_{0.9}VPO_4F$, 1.459 grams $VPO_4$, 0.026 grams of LiF, and 0.378 grams of NaF were premixed, pelletized, placed in an oven and heated to an ultimate temperature of 700° C. The temperature is maintained for fifty minutes after which the sample is cooled to room temperature and removed from the oven. To make $Li_{0.95}Na_{0.05}VPO_4F$, 1.459 grams of $VPO_4$, 0.246 grams of LiF, and 0.021 grams of NaF are mixed together and heated in an oven as in the previous step. An electrode is made with 84% of the active material, 6% of Super P conductive carbon, and 10% poly vinylidene difluoride. A cell with that electrode as cathode and carbon intercalation anode is constructed with an electrolyte comprising 1 M $LiPF_6$ dissolved in 2:1 by weight mixture of ethylene carbonate:dimethyl carbonate.

EXAMPLE 7

An electrode active material comprising $NaVPO_4F$ is made hydrothermally according to the following reaction scheme.

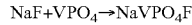
$NaF+VPO_4 \rightarrow NaVPO_4F$ 1.49 grams of $VPO_4$ and 1.42 grams of NaF are premixed with approximately 20 milliliters of deionized water, transferred and sealed in a Parr Model 4744 acid digestion bomb, which is a Teflon lined stainless steel hydrothermal reaction vessel. The bomb is placed in an oven and heated at a ramp rate of 5° per minute to an ultimate temperature of 250° C. to create an internal pressure and maintained at this temperature for forty-eight hours. The sample is slowly cooled to room temperature and removed from the furnace for analysis. The product sample is washed repeatedly with deionized water to remove unreacted impurities. Then the sample is dried in an oven equipped with argon gas flow at 250° C. for one hour. An electrode is made with 84% of the active material, 6% of Super P conductive carbon, and 10% poly vinylidene difluoride. A cell with that electrode as cathode and carbon intercalation anode is constructed with an electrolyte comprising 1 M $LiPF_6$ dissolved in 2:1 by weight mixture of ethylene carbonate:dimethyl carbonate.

EXAMPLE 8

An electrode active material of formula $NaVPO_4OH$ is made according to the following reaction scheme.

$NaOH+VPO_4 \rightarrow NaVPO_4OH$

In this Example, the reaction of the Example 7 is repeated, except that an appropriate molar amount of sodium hydroxide is used instead of sodium fluoride. The reaction is carried out hydrothermally as in Example 7. The hydroxyl group is incorporated into the active material at the relatively low temperature of reaction. An electrode is made with 84% of the active material, 6% of Super P conductive carbon, and 10% poly vinylidene difluoride. A cell with that electrode as cathode and carbon intercalation anode is constructed with an electrolyte comprising 1 M $LiPF_6$ dissolved in 2:1 by weight mixture of ethylene carbonate:dimethyl carbonate.

EXAMPLE 9

An electrode active material comprising $NaVPO_4F$ is made according to the following reaction scheme.

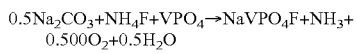
$0.5Na_2CO_3+NH_4F+VPO_4 \rightarrow NaVPO_4F+NH_3+ 0.500O_2+0.5H_2O$ 1.23 grams of $VPO_4$, 0.31 grams of $NH_4F$, and 0.45 grams $Na_2CO_3$ are premixed with approximately 20 milliliters of deionized water and transferred and sealed in a Parr Model 4744 acid digestion bomb, which is a Teflon lined stainless steel reaction vessel. The bomb is placed in an oven and heated to an ultimate temperature of 250° 0 and maintained at this temperature for forty-eight hours. The sample is cooled to room temperature and removed for analysis. The sample is washed repeatedly with the deionized water to remove unreacted impurities and thereafter is dried in an argon atmosphere at 250° C. for an hour. An electrode is made with 84% of the active material, 6% of Super P conductive carbon, and 10% poly vinylidene difluoride. A cell with that electrode as cathode and carbon intercalation anode is constructed with an electrolyte comprising 1 M $LiPF_6$ dissolved in 2:1 by weight mixture of ethylene carbonate:dimethyl carbonate.

EXAMPLE 10

Electrode active materials comprising compounds of the formula $LiV_{1-x}Al_xPO_4$ were made according to the following reaction scheme:

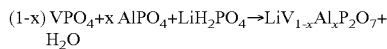
$(1-x) VPO_4+x\ AlPO_4+LiH_2PO_4 \rightarrow LiV_{1-x}Al_xP_2O_7+ H_2O$ The precursors were mixed using a mortar and pestle and then pelletized. The pellet was transferred to an oven equipped with a flowing argon atmosphere. The samples were heated at a ramp rate of 2° per minute to an ultimate temperature of about 650° C. to about 850° C. and maintained at these temperatures for about 4 to about 8 hours. The sample is cooled and removed from the furnace. An electrode is made with 84% of the active material, 6% of Super P conductive carbon, and 10% polyvinylidene difluoride. A cell with that electrode as cathode and lithium anode is constructed with an electrolyte comprising 1M LiPF$_6$ dissolved in 2:1 by weight ethylene carbonate to dimethyl carbonate is constructed and tested.

Figure 17:
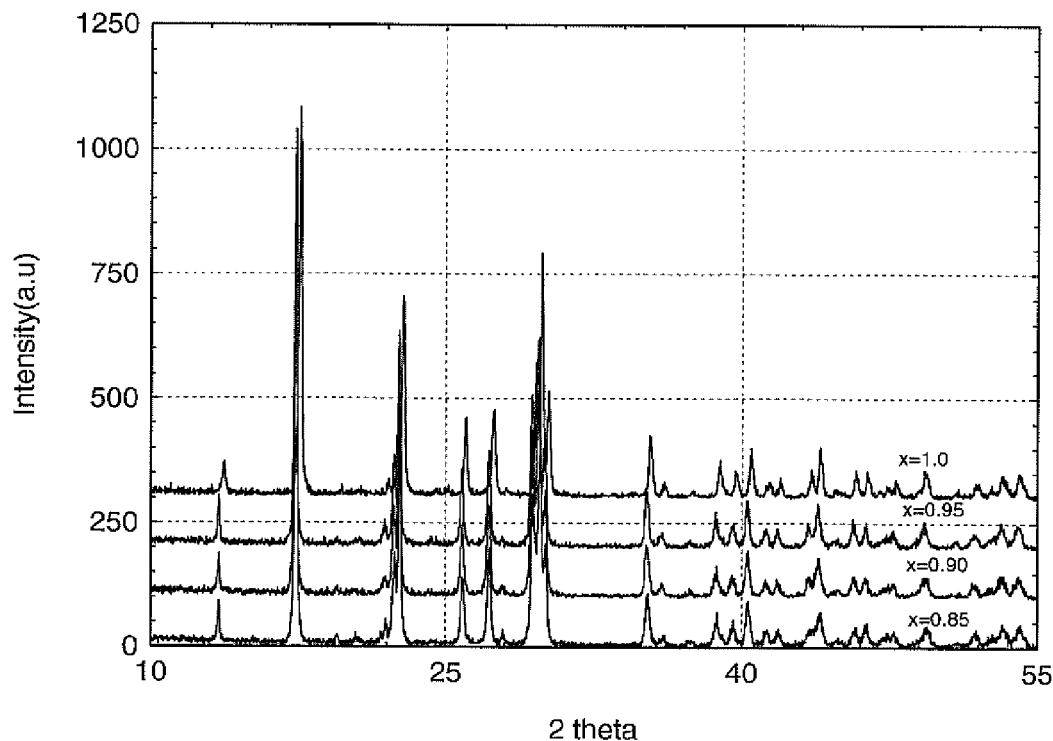
FIG. 17 shows X-ray patterns for samples of $LiV_{1-x}Al_xPO_4F$ prepared according to the process of Example 10.

Al$^{3+}$ is electrochemically inactive and therefore reduces the amount of Li that can be extracted. Thus many of the samples prepared were lower Al content samples, typically in the range of 5-15% Al doping. The X-ray patterns for a selection of samples so prepared are shown in FIG. 17.

Figure 18:
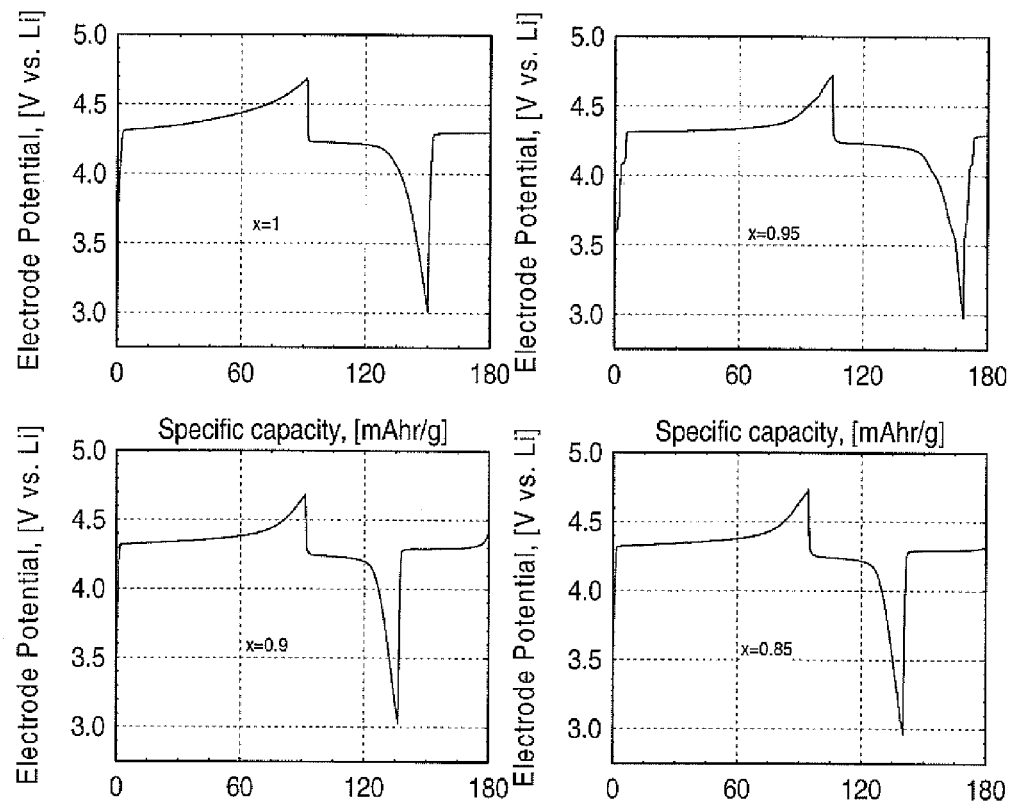
FIG. 18 shows the electrochemical results for samples of $LiV_{1-x}Al_xP_2O_7$ prepared according to Example 10.

The electrochemical properties of the samples so prepared are shown in FIG. 18.

EXAMPLE 11

An electrode active material comprising Li$_3$V$_2$(PO$_4$)$_3$ was made according to the following reaction scheme.

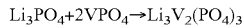

$$Li_3PO_4 + 2VPO_4 \rightarrow Li_3V_2(PO_4)_3$$

LiPO$_4$ (11.58 g) and VPO$_4$ (29.18 g) were used. The precursors were mixed using a mortar and pestle and then pelletized. The pellet was transferred to an oven equipped with a flowing argon atmosphere. The samples were heated at a ramp rate of 2° per minute to an ultimate temperature of about 650° C. to about 850° C. and preferably 700 to 750° C. and maintained at these temperatures for about 1 to about 8 hours. The sample is cooled and removed from the furnace.

Figure 19:
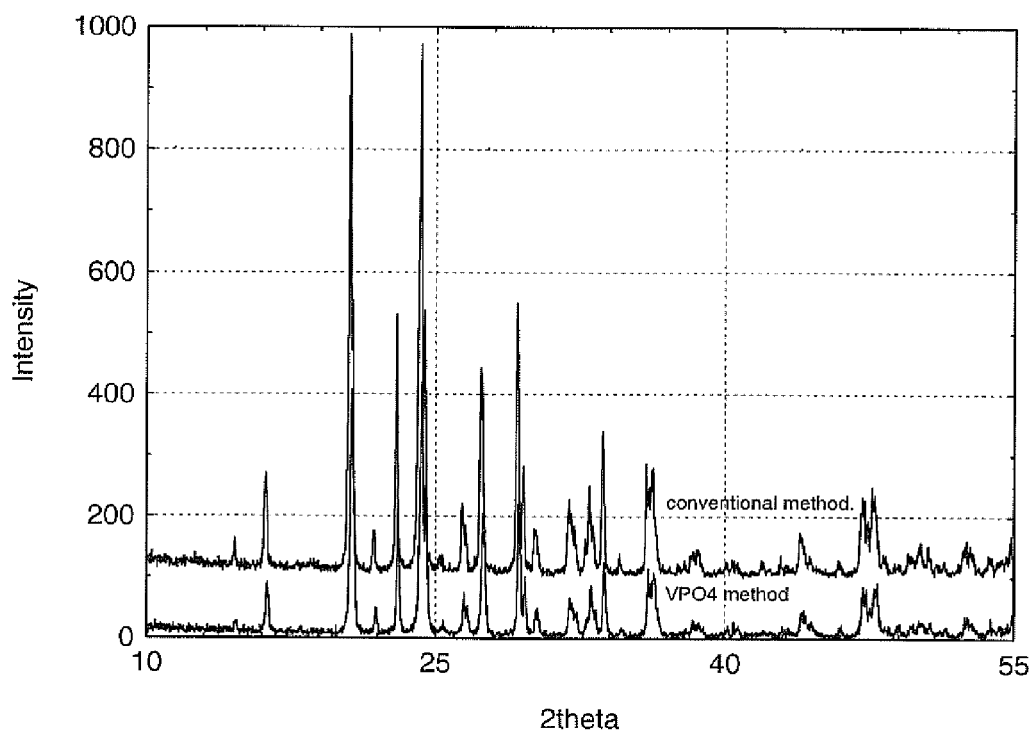
FIG. 19 shows a comparison of a sample of LVP prepared using conventional known methods and prepared using the $VPO_4$ process according to Example 11.

FIG. 19 shows a representative X-ray pattern of a sample prepared as above.

An electrode is made with 84% of the active material, 6% of Super P conductive carbon, and 10% poly vinylidene difluoride. A cell with that electrode as cathode and a lithium anode is constructed with an electrolyte comprising 1 M LiPF$_6$ dissolved in 2:1 by weight mixture of ethylene carbonate:dimethyl carbonate.

Figure 20:
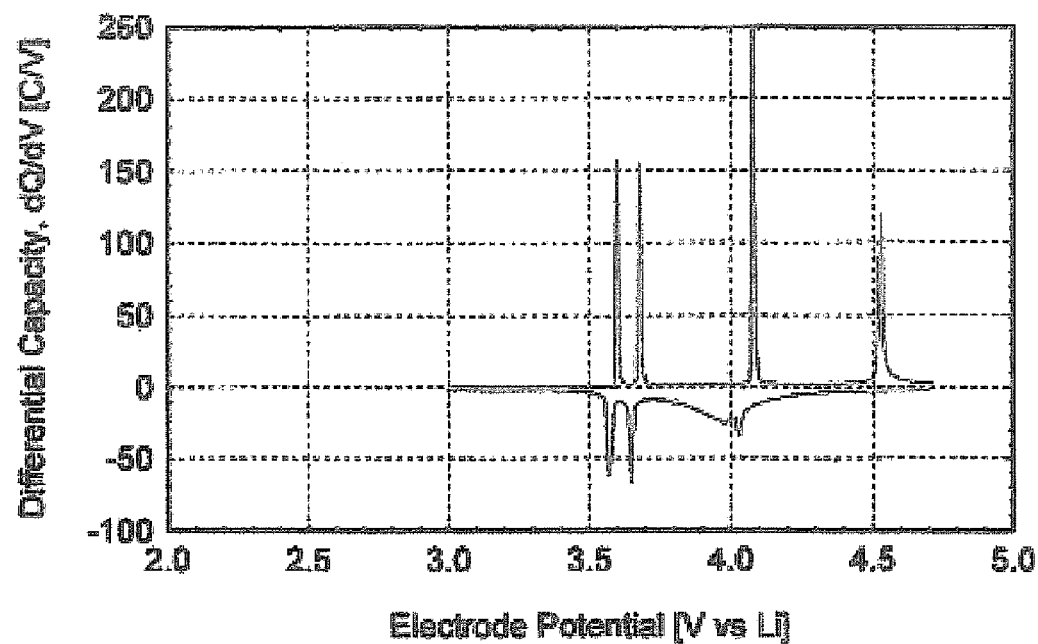
FIG. 20 shows the EVS electrochemical response for LVP sample prepared according to Example 11

FIG. 20 shows the electrochemical properties of the sample.

EXAMPLE 12

An electrode active material comprising Na$_3$V$_2$(PO$_4$)$_2$F$_3$ is made as follows. First, a VPO$_4$ precursor is made according to the following reaction scheme.

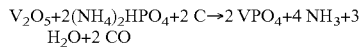

$$V_2O_5 + 2(NH_4)_2HPO_4 + 2 C \rightarrow 2 VPO_4 + 4 NH_3 + 3 H_2O + 2 CO$$

A mixture of 18.2 g (0.1 mol) of V$_2$O$_5$, 26.4 g (0.2 mol) of (NH$_4$)$_2$HPO$_4$, and 2.64 g (0.2 mol+10% mass excess) of elemental carbon was made, using a mortar and pestle. The mixture was pelletized, and transferred to a box oven equipped with an argon gas flow. The mixture was heated to a temperature of about 350° C., and maintained at this temperature for 3 hours. The mixture was then heated to a temperature of about 750° C., and maintained at this temperature for 8 hours. The product is then cooled to ambient temperature (about 21° C.).

Na$_3$V$_2$(PO$_4$)$_2$F$_3$ was then made from the VPO$_4$ precursor. The material was made according to the following reaction scheme.

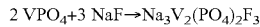

$$2 VPO_4 + 3 NaF \rightarrow Na_3V_2(PO_4)_2F_3$$

Figure 21:
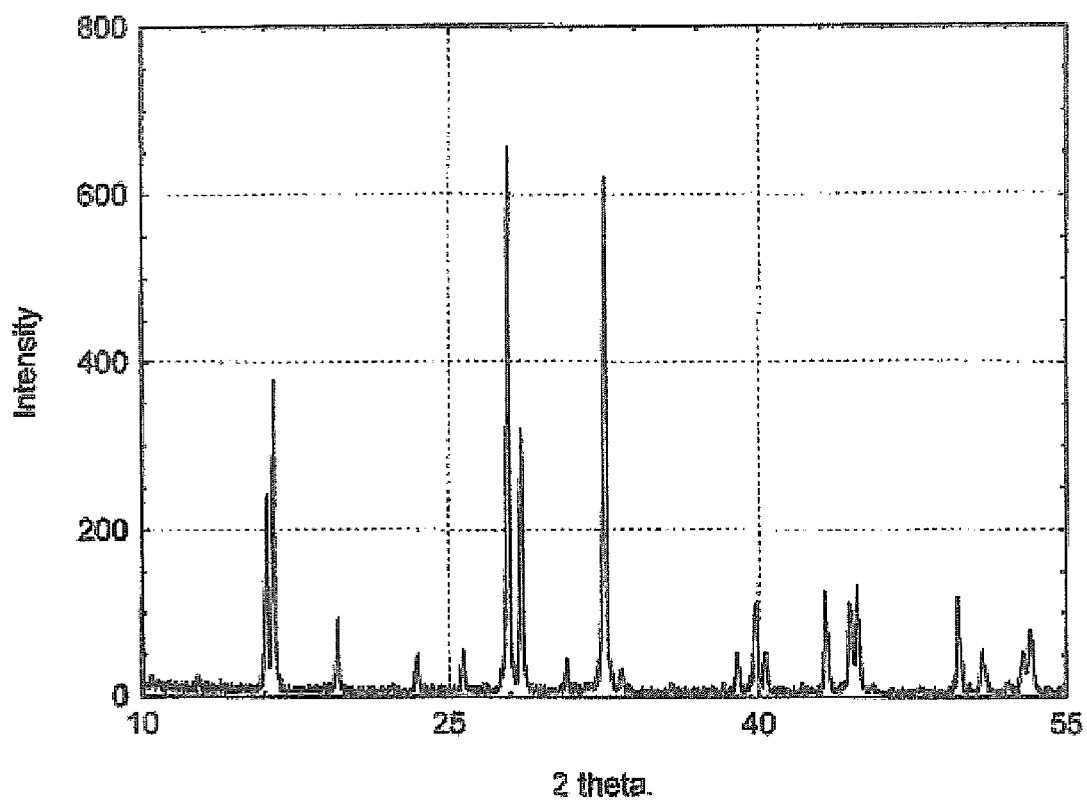
FIG. 21 shows the X-ray powder pattern for the sample of $Na_3V_2(PO_4)_2F_3$ prepared according to the method of Example 12.

A mixture of VPO$_4$ (2.918 g) and NaF (1.26 g) was made, using a mortar and pestle. The mixture was pelletized, and transferred to a temperature-controlled tube furnace equipped with an argon gas flow. The mixture is heated at a ramp rate of about 220/minute to an ultimate temperature of about 750° C. for 1 hour Temperatures can be in the region of 700-800° C. for these samples and can be heated in this region for about one to about four hours. The product is then cooled to ambient temperature (about 20° C.). A representative X-ray powder pattern is shown in FIG. 21 X-ray powder diffraction analysis for the Na$_3$V$_2$(PO$_4$)$_2$F$_3$ material indicated the material to be single phase with a tetragonal structure (space group P42/mnm). The unit cell parameters (a=9.0304(5) Å, c=10.6891 (9) Å) were calculated from a least squares refinement procedure, in fair agreement with the structural analysis for Na$_3$V$_2$(PO$_4$)$_2$F$_3$ described by Meins et al., J. Solid State Chem., 148, 260, (1999). (i.e. a=9.047(2) Å, c=10.705(2) Å).

EXAMPLE 13

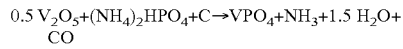

$$0.5 V_2O_5 + (NH_4)_2HPO_4 + C \rightarrow VPO_4 + NH_3 + 1.5 H_2O + CO$$

Vanadium oxide (V$_2$O$_5$; 9.10 g), diammonium hydrogen phosphate (13.2 g) and elemental carbon (1.32 g, 10% mass excess) were weighed and poured into a micronising pot. The materials were then micronised for 15 minutes. This process step has the dual purpose of providing intimate mixing and dispersion of the raw materials to produce a homogenous mixture and reducing particles size of the material due to the grinding/milling action. After micronising, the resulting powder was pressed to form a pellet. The pellet was placed in a crucible and placed in a tube furnace. The pellet was fired at 700° C. at a ramp rate of 2° C./minute with a 16 hour dwell under an inert atmosphere. After firing, the pellet was broken up and ground to produce a powder. FIG. 23 shows the X-rd trace for the resulting VPO$_4$. The trace shows that the VPO$_4$ is an amorphous V—P—O/C precursor.

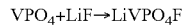

$$VPO_4 + LiF \rightarrow LiVPO_4F$$

The VPO$_4$ (1.46 g) precursor so obtained was then micronised for 15 minutes with LiF (0.26 g). After micronising, the resultant powder was pressed to form a pellet was placed in a crucible, sealed by a second crucible and placed in a tube furnace. The pellet is fired at 700° C. at a ramp rate of 2° C./minute with a one hour dwell under an inert atmosphere. After firing, the pellet was broken up and ground to produce the final LiVPO$_4$F material. FIG. 24 shows the Xrd trace for the resulting LiVPO$_4$F.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A method for making a vanadium phosphate precursor comprising mixing V$_2$O$_5$ with a phosphate compound and a carbon containing compound or a carbon precursor to form a mixture, milling or micronizing the mixture, and heating the milled or micronized mixture at a temperature of about 600° C. and for a time sufficient to form an amorphous V—P—O—carbon composite precursor.

2. The method according to claim 1 wherein the phosphate compound is (NH$_4$)$_2$HPO$_4$ or (NH$_4$)H$_2$PO$_4$.

3. The method according to claim 1 wherein the carbon is a conductive high surface area carbon with a surface area of from about 1 to about 1000 m$^2$/g.

4. The method according to claim 3 wherein the carbon is carbon black.

5. The method according to claim 2 wherein the carbon is selected from a graphitic carbon or organic precursor materials.

6. A method for making a vanadium phosphate compound of the formula:

$$A_aV_{1-x}M_x(PO_4)_dZ_f \quad (I)$$

wherein A is selected from the group consisting of Li, Na, K and mixtures thereof;
a is greater than 0.1 and less than or equal to 3;
x is greater than or equal to zero and less than 1;
d is greater than 0 and less than or equal to 3;
M is a metal selected from the group consisting of Al, Ti, Cr, Fe, Mn, Mo, and Nb;
Z is F, Cl, or OH:
and f is greater than or equal to zero but less than or equal to three;
comprising mixing the V—P—O—carbon composite precursor produced according to the method of claim 1 with an alkali metal containing compound to form a mixture and heating the mixture at a temperature and for a time sufficient to form the vanadium phosphate compound.

7. The method according to claim 6 wherein the mixture further comprises a second metal containing compound.

8. The method according to claim 6 wherein the alkali metal compound is selected from the group consisting of LiF, NaF, NaOH, LiOH, Na$_2$CO$_3$ and Li$_3$PO$_4$.

9. The method according to claim 7 wherein the metal containing compound comprises a metal ion of a metal selected from the group consisting of Al, Ti, Cr, Fe, Mn, Mo and Nb.

10. The method according to claim 6 wherein the vanadium phosphate compound produced is selected from LiVPO$_4$, Li$_{0.1}$Na$_{0.9}$VPO$_4$F, NaVPO$_4$F, NaVPO$_4$OH, NaVPO$_4$F, Li$_3$V$_2$(PO$_4$)$_3$, LiV$_{0.75}$Al$_{0.25}$PO$_4$F, LiV$_{0.5}$Al$_{0.5}$PO$_4$F, Na$_{1.2}$VPO$_4$F$_{1.2}$ or Na$_3$V$_2$(PO$_4$)$_2$F$_3$.

11. A method for making a vanadium phosphate compound of the formula:

$$A_aV_{1-x}M_xM_xP_2O_7 \quad (I)$$

wherein A is selected from the group consisting of Li, Na, K and mixtures thereof;
a is greater than 0.1 and less than or equal to 3;
x is greater than or equal to zero and less than 1; and
M is a metal selected from the group consisting of Al, Ti, Cr, Fe, Mn, Mo and Nb;
comprising mixing the V—P—O—carbon composite precursor produced according to the method of claim 1 with an alkali metal containing compound to form a mixture and heating the mixture at a temperature and for a time sufficient to form the vanadium phosphate compound.

12. The method according to claim 11 wherein the mixture further comprises a second metal containing compound.

13. The method according to claim 11 wherein the alkali metal compound is selected from the group consisting of LiF, NaF, NaOH, LiOH, Na$_2$CO$_3$ and Li$_3$PO$_4$.

14. The method according to claim 12 wherein the metal containing compound comprises a metal ion of a metal selected from the group consisting of Al, Ti, Cr, Fe, Mn, Mo and Nb.

15. The method according to claim 11 wherein the vanadium phosphate compound produced is LiVP$_2$O$_7$.

* * * * *

UNITED STATES PATENT AND TRADEMARK OFFICE
CERTIFICATE OF CORRECTION

PATENT NO. : 8,313,719 B2  
APPLICATION NO. : 13/106196  
DATED : November 20, 2012  
INVENTOR(S) : Jeremy Barker et al.

Page 1 of 1

It is certified that error appears in the above-identified patent and that said Letters Patent is hereby corrected as shown below:

In the Specifications

Column 3, Line 14  
Delete "$LiV_{i-x}$" Insert --$LiV_{1-x}$--

Column 6, Line 32  
Delete "$SO//2)_2$" Insert --$SO_2)_2$--

Column 16, Line 36  
Delete "$0.500O_2$" Insert --$0.5CO_2$--

Column 16, Line 43  
Delete "250°0" Insert --250°C--

Column 17, Line 67  
Delete "220/minute" Insert --2°/minute--

Signed and Sealed this  
Twenty-eighth Day of May, 2013

Teresa Stanek Rea  
*Acting Director of the United States Patent and Trademark Office*